US011099020B2

(12) United States Patent
Beaurepaire et al.

(10) Patent No.: US 11,099,020 B2
(45) Date of Patent: Aug. 24, 2021

(54) METHOD AND APPARATUS FOR OPTIMIZING INTERMODAL ROUTE COMPUTATIONS

(71) Applicant: HERE GLOBAL B.V., Eindhoven (NL)

(72) Inventors: Jerome Beaurepaire, Berlin (DE); Jens Unger, Berlin (DE)

(73) Assignee: HERE Global B.V., Eindhoven (NL)

(*) Notice: Subject to any disclaimer, the term of this patent is extended or adjusted under 35 U.S.C. 154(b) by 142 days.

(21) Appl. No.: 16/424,096

(22) Filed: May 28, 2019

(65) Prior Publication Data
US 2020/0378775 A1    Dec. 3, 2020

(51) Int. Cl.
G01C 21/34    (2006.01)

(52) U.S. Cl.
CPC ..... *G01C 21/3446* (2013.01); *G01C 21/3423* (2013.01); *G01C 21/3461* (2013.01)

(58) Field of Classification Search
CPC ............ G01C 21/3446; G01C 21/3423; G01C 21/3461
See application file for complete search history.

(56) References Cited

U.S. PATENT DOCUMENTS

| 8,909,475 | B2 | 12/2014 | Gishen | |
| 2007/0129885 | A1* | 6/2007 | Wellmann | G01C 21/3446 |
| | | | | 701/428 |
| 2008/0195428 | A1* | 8/2008 | O'Sullivan | G06Q 10/02 |
| | | | | 705/6 |
| 2013/0046456 | A1 | 2/2013 | Scofield et al. | |
| 2014/0025289 | A1* | 1/2014 | Schunder | G01C 21/3691 |
| | | | | 701/430 |
| 2016/0231129 | A1 | 8/2016 | Erez et al. | |
| 2017/0213273 | A1 | 7/2017 | Dietrich et al. | |
| 2020/0249047 | A1* | 8/2020 | Balva | G01C 21/3492 |

FOREIGN PATENT DOCUMENTS

KR    101111733 B1 *  2/2012

OTHER PUBLICATIONS

Machine Translation of KR101111733B1 (Year: 2012).*
Kirchler, "Efficient Routing on Multi-modal Transportation Networks", Oct. 28, 2013, retrieved from https://pastel.archives-ouvertes.fr/pastel-00877450/document, 148 pages.

* cited by examiner

Primary Examiner — Anne Marie Antonucci
Assistant Examiner — Sahar Motazedi
(74) Attorney, Agent, or Firm — Ditthavong, Steiner & Mlotkowski

(57) ABSTRACT

An approach is provided for optimizing intermodal route computations. A routing platform retrieves shared vehicle availability data associated with one or more modes of transport for geographic areas. The routing platform further processes the shared vehicle availability data to determine a shared vehicle availability pattern for each geographic area. The routing platform further generates, based on the shared vehicle availability pattern, an intermodal vehicle availability model indicating a combination of modes of transport for each geographic area, wherein the geographic areas are selectively excluded from computations to generate an intermodal route. The routing platform further provides the intermodal vehicle availability model as an output for generating the intermodal route.

19 Claims, 14 Drawing Sheets

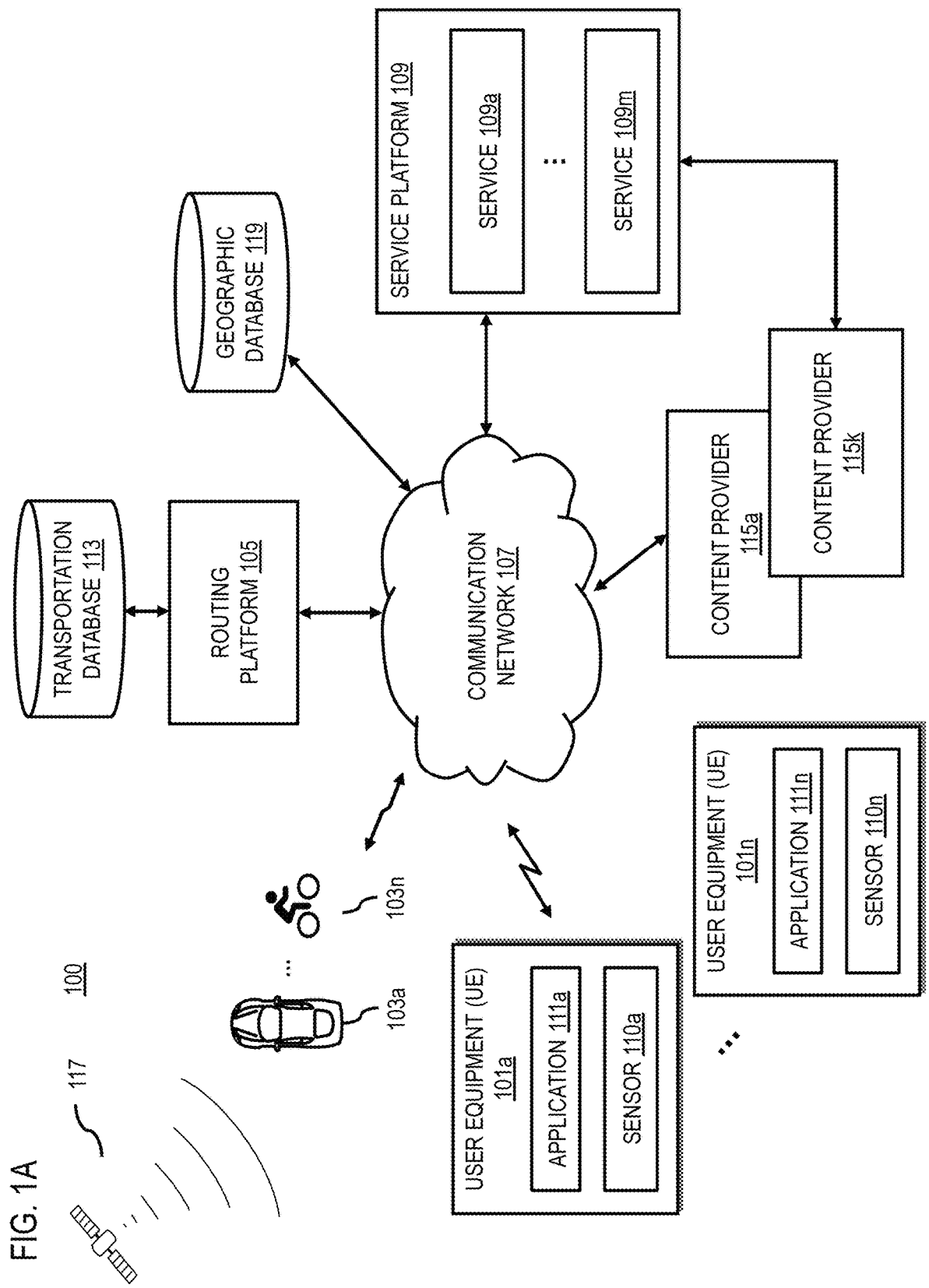

METHOD AND APPARATUS FOR OPTIMIZING INTERMODAL ROUTE COMPUTATIONS

BACKGROUND

Service providers and automobile manufacturers are continually challenged to deliver value and convenience to consumers by, for example, providing compelling navigation services. One area of interest has been the development of intermodal routing services that provide routes combining different routing modes for car, pedestrian and public transit. For example, an intermodal transit and routing service can leverage real-time transport mode data to provide routes that combine different transport modes, such as cars, walking, public transit, shared vehicles, etc. to reach a destination. However, as the numbers of shared vehicles, their providers, and/or other transport options increase in many cities around the world, there computational complexity and resources requirements for those computations can also increase. Accordingly, service providers face significant technical challenges to optimize intermodal routing computations to more efficiently use available computing resources.

SOME EXAMPLE EMBODIMENTS

Therefore, there is a need for an approach for optimizing intermodal route computations.

According to one embodiment, a method retrieving shared vehicle availability data for one or more geographic areas, wherein the shared vehicle availability data is associated with one or more modes of transport that can be used to generate an intermodal route. The method also comprises processing the shared vehicle availability data to determine a shared vehicle availability pattern for each of the one or more geographic areas. The method further comprises generating an intermodal vehicle availability model based on the shared vehicle availability pattern, wherein the intermodal vehicle availability model indicates a possible combination of the one or more modes of transport for said each geographic area. The method further comprises providing the intermodal vehicle availability model as an output for generating the intermodal route, wherein the one or more geographic areas are selectively excluded from computations to generate the intermodal route based on the possible combination of the one or more modes of transport for said each geographic area.

According to another embodiment, an apparatus comprises at least one processor, and at least one memory including computer program code for one or more computer programs, the at least one memory and the computer program code configured to, with the at least one processor, retrieve shared vehicle availability data for one or more geographic areas, wherein the shared vehicle availability data is associated with one or more modes of transport that can be used to generate an intermodal route. The apparatus is also caused to process the shared vehicle availability data to determine a shared vehicle availability pattern for each of the one or more geographic areas. The apparatus is further caused to generate an intermodal vehicle availability model based on the shared vehicle availability pattern, wherein the intermodal vehicle availability model indicates a possible combination of the one or more modes of transport for said each geographic area. The apparatus is further caused to provide the intermodal vehicle availability model as an output for generating the intermodal route, wherein the one or more geographic areas are selectively excluded from computations to generate the intermodal route based on the possible combination of the one or more modes of transport for said each geographic area.

According to another embodiment, a computer-readable storage medium carries one or more sequences of one or more instructions which, when executed by one or more processors, cause, at least in part, an apparatus to retrieve shared vehicle availability data for one or more geographic areas, wherein the shared vehicle availability data is associated with one or more modes of transport that can be used to generate an intermodal route. The apparatus is also caused to process the shared vehicle availability data to determine a shared vehicle availability pattern for each of the one or more geographic areas. The apparatus is further caused to generate an intermodal vehicle availability model based on the shared vehicle availability pattern, wherein the intermodal vehicle availability model indicates a possible combination of the one or more modes of transport for said each geographic area. The apparatus is further caused to provide the intermodal vehicle availability model as an output for generating the intermodal route, wherein the one or more geographic areas are selectively excluded from computations to generate the intermodal route based on the possible combination of the one or more modes of transport for said each geographic area.

According to another embodiment, an apparatus comprises means for retrieving shared vehicle availability data for one or more geographic areas, wherein the shared vehicle availability data is associated with one or more modes of transport that can be used to generate an intermodal route. The apparatus also comprises means for processing the shared vehicle availability data to determine a shared vehicle availability pattern for each of the one or more geographic areas. The apparatus further comprises means for generating an intermodal vehicle availability model based on the shared vehicle availability pattern, wherein the intermodal vehicle availability model indicates a possible combination of the one or more modes of transport for said each geographic area. The apparatus further comprises means for providing the intermodal vehicle availability model as an output for generating the intermodal route, wherein the one or more geographic areas are selectively excluded from computations to generate the intermodal route based on the possible combination of the one or more modes of transport for said each geographic area.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1A is a diagram of a system for optimizing intermodal route computations, according to one embodiment;

DESCRIPTION OF SOME EMBODIMENTS

Figure 1B:
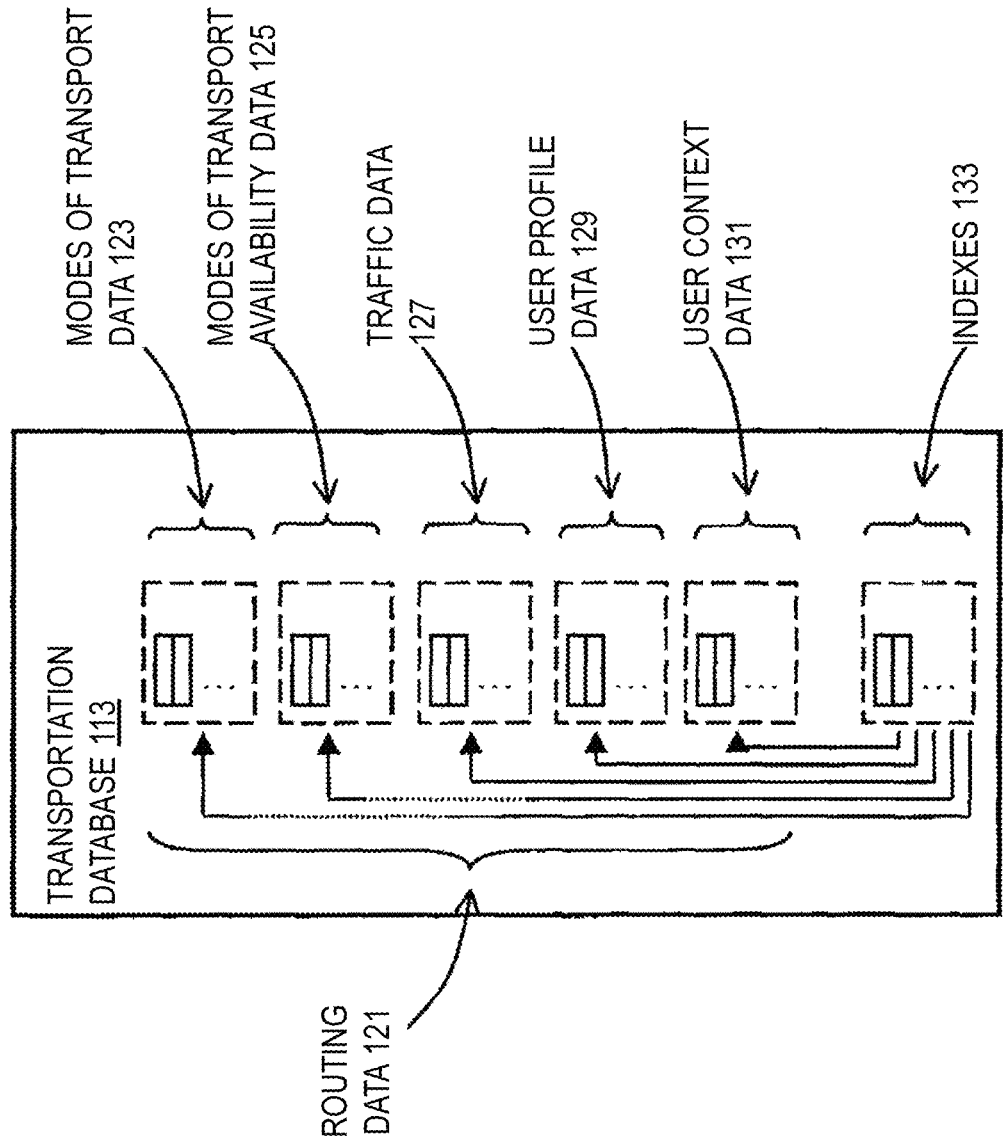
FIG. 1B is a diagram of a transportation database, according to one embodiment.

Examples of a method, apparatus, and computer program for optimizing intermodal route computations are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

FIG. 1A is a diagram of a system for optimizing intermodal route computations, according to one embodiment. As transportation options or modes of transport (e.g., personal vehicles, shared vehicles, autonomous vehicles, public transport, etc.) increase, the task of generating a route to guide a user to a destination is also increasing in complexity. With the emergence of shared vehicle services (e.g., shared cars, bicycles, scooters, etc.), the options for generating intermodal routes have also increased. In particular, vehicle sharing operators offer different types of vehicles at different locations, and users with different preferences and memberships with different vehicle sharing operators select and operate different shared vehicles to different destinations, such that routing users to their destinations via various transport modes of different operators requires tremendous real-time computations. For example, in the greater Washington D.C. area, there are more than ten commercial fleets and thousands of privately-owned self-service shared vehicles (bicycles, scooters, motorcycles, passenger cars, trucks, trailers, etc.) to be picked up and dropped off at specific locations or at any metered parking spots, for personal use, ridesharing, food, package, and grocery delivery services or other business uses. Historically, conventional navigation systems (e.g., embedded car navigation systems) may offer assistance by computing Park and Ride routes which mostly leverage static parking content and combines it with public transportation data, without considering shared vehicles offered by different operators. As a result, conventional routes consider only vehicles of one operator to reach a destination. On the other hand, there is a demand to track all available shared vehicles to compute intermodal routing for a user, which, however, is time consuming and frustrating, considering various types of shared vehicles (e.g., a car, a motorcycle, an electric bike, an electric scooter, a bicycle, a boat, etc.) managed by different operators, relevant reservation criteria (e.g., a reservation time length, a number of concurrent reservation limit, etc.), promotions (e.g., the first 30 minutes free for a new user, a bonus if returning to the pickup location or preferred locations, etc.), dropping off criteria (e.g., distance, location, area limitations), the route to the final destination of the user, etc. As used herein, multimodal routing refers to a parallel calculation of single-mode routes between an origin and a destination, i.e., getting from A to B individually using one of different modes of transport. Intermodal routing refers to routing calculation involving switching between different modes of transport to complete a trip from an origin to a destination. For example, on the way walking out of a subway station, the user is presented with many shared vehicles in vicinity to ride to a destination.

To address this problem, a system 100 of FIG. 1A introduces a capability to efficiently provide intermodal routing services by contextually identifying possible transport modes combinations per given area (and for a given time) before receiving a routing request. The system 100 pre-computes the possible transport mode combinations for an area by monitoring all shared vehicles over time and identifying patterns of unavailability of transport modes (e.g. shared cars or scooters) in the area. The system 100 generates an intermodal vehicle availability model that marks some area(s) as not suitable for intermodal routes that would need to use the unavailable transport modes for a given time period.

In one embodiment, the system 100 optimizes a user's travel time (or route or other routing cost function parameter such as distance, fuel efficiency, etc.) to a destination by considering all possible modes of transport (e.g., public transport buses, trains, shared vehicles, etc.) using the pre-computed intermodal vehicle availability model that excludes areas where no shared vehicle is available, to identify one or more optimal intermodal routes to the destination. Optimal, for instance, refers to a combination of modes of transport that enables the user to reach a destination with a time, distance, etc. that meets threshold requirements or is a minimum among calculated candidate intermodal routes. For example, a multimodal route can direct a user to walk to a first location, then take a single-user shared vehicle (e.g., an e-scooter) to a rendezvous location (e.g., a public Park & Ride lot) to be picked up by a multi-user shared vehicle (e.g., carpool to downtown Washington D.C.). The multi-user shared vehicle will then drive the remaining portion of the route to a final destination. In this example, the intermodal route comprises a first walking segment, a second single-user shared vehicle segment, and a third multi-user shared vehicle segment.

In one embodiment, the system 100 can determine transport availability information (e.g., either the availability of transport modes or the unavailability of transport modes) based on static transport schedule data, and/or real-time transport tracking data. By way of example, the transport modes may include a public transit mode, a pedestrian mode, a bicycling mode, a shared vehicle, etc. A shared vehicle may be a car, a motorcycle, an electric bike, an electric scooter, a bicycle, a boat, etc. owned by an individual, a commercial business, a public agency, a cooperative, or an ad hoc grouping. In one embodiment, the real-time transport tracking data may be retrieved from databases of such individual, commercial business, public agency, cooperative, or ad hoc grouping. In another embodiment, the real-time transport tracking data may be transit probe data retrieved from third party databases.

As previously described, a shared vehicle may be an autonomous vehicle owned or shared by the user. The vehicle (e.g., cars, motorcycles, electric bikes, electric scooters, bicycles, boats, airplanes, etc.) can be human-operated, semi-autonomous, or autonomous. In one embodiment, the user owns an autonomous vehicle which operates autonomously to a meeting or rendezvous point of a route calculated according to the embodiments to meet up with the user and travel to the final destination of the route. In another embodiment, a driver (e.g., a contact or a stranger) operates the vehicle to a riding point, to either handover the vehicle to the user or to continue riding together with the user to a destination. In another embodiment, the human-operated or semi-autonomous vehicle is owned by a business entity, a public entity, a stranger, or a contact of the user, and the contact or stranger agrees to operate the vehicle to a riding point, to either handover the vehicle to the user or to continue riding together with the user to a destination. These embodiments are applicable to centralized ride-sharing, free-floating ride-sharing, peer-to-peer ride-sharing, car-pooling, taxi cabs, food delivery, etc.

By way of example, free-floating commercial ride-sharing (e.g., dockless commercial fleets of e-scooters) is increasingly popular in major cities around the world for the convenience of free-floating parking at many areas in the cities Since the parking locations are not fixed, as return hubs or the like, such a vehicle can park in the same manner as a privately-owned vehicle is parked on the street. This creates the problem of not having fixed hubs where such vehicles may be available, i.e., no fixed nodes for routing. In one embodiment, the system 100 determines trends in, e.g., a city grid cell, tessellation cell, Voronoi cell, etc., where such vehicles become available, and calculates where nodes for intermodal routing are available.

In one embodiment, the system 100 receives a user request to route to a destination. For example, the user can request an intermodal route to a destination such that one possible candidate intermodal route or the best calculated route (e.g., route taking the least amount of travel time and/or distance). In another embodiment, the system 100 detects a user travel pattern/habit and predicts the user's need for an intermodal route to reach a destination. In yet another embodiment, the system 100 detects the user's need for an intermodal route from an entry in the user's calendar, a social media event accepted or signed up by the user, an event in the user's massage (e.g., email, text message, instant message, SMS message, MMS message, etc.).

In one embodiment, UEs 101 of a user and sensors in a vehicle 103 are collecting and reporting data (e.g., location data) to the system 100 to support the determining vehicle locations and/or multimodal routing according to the embodiments described herein. In this way, for instance, vehicles 103a-103n and/or vehicle users can use the system for sharing trajectory data and receiving vehicle supply and demand information as well as contextual data (e.g., traffic, weather conditions, etc.) that can be used to dynamically update the vehicle locations and/or multimodal routes to determine the route that optimizes or reduces the amount of time, distance, etc. to a destination. With this data along with other data such as but not limited to public transport information, the system 100 (e.g., a routing platform 105) can compute candidate intermodal routes to a destination that includes segments for the user to travel to a destination. In this way, the system 100 can more precisely present to the user transport modes to travel to the destination. In one embodiment, the UEs 101 and the routing platform 105 have connectivity via a communication network 107.

In one embodiment, the vehicles 103a-103n are equipped with a device (e.g., the UE 101 or other accessory device) that records the vehicles' trajectory data (e.g., position, speed, etc.). In one embodiment, the UE 101 may be configured with one or more sensors 110a-110n (also collectively referred to as sensors 110) for determining the trajectory data (including parking locations). By way of example, the sensors 110 may include location sensors (e.g., GPS), accelerometers, compass sensors, gyroscopes, altimeters, etc.

In one embodiment, after a journey or the trajectory data is recorded (e.g., upon parking), the trajectory data is analyzed (e.g., by respective applications 111a-111n and/or the routing platform 105 for storage in, for instance, a transportation database 113 and/or a geographic database 119) to determine parking locations. In one embodiment, timestamp information indicating at which time and which location the vehicle was parked is recorded as a record in the transportation database 113. In one embodiment, the record is then transmitted or uploaded to the routing platform 105. In addition or alternatively, the raw trajectory data may be uploaded to the routing platform 105 to determine the record. In yet another embodiment, the record and/or trajectory data may be maintained at the UE 101 device for local processing to determine vehicle parking information for transmission to the routing platform 105 and/or other vehicles/UEs 101 (e.g., when operating in a peer-to-peer network architecture).

In one embodiment, when the UE 101 requests one or more optimal intermodal routes to a destination, the routing platform 105 computes candidate intermodal routes that includes a segment for the user to travel from the user location to an intermediate location via an alternate transport mode, based on data from the transportation database 113 and/or the geographic database 119. The alternate transport mode may include walking, cycling, motorbiking, taking one or more taxis, taking one or more buses, taking one or more trains, taking one or more subways, taking one or more ferries, taking one or more shared vehicles, or a combination thereof.

In one embodiment, the routing platform 105 computes a segment for the user to get to the riding point using the alternate transport mode, assuming there is no delay of the estimated arrival time. In another embodiment, the routing platform 105 computes a segment for the user to get to the riding point using the alternate transport mode, when detecting there is traffic and/or weather delay of the estimated arrival time.

In one embodiment, the routing platform 105 is configured to monitor the user and the vehicle in order to generate travel status information. In addition, the routing platform 105 may present to the user a real-time status of the vehicle and/or an estimated or predicted status of the vehicle to arrive at a riding point. The status information may also be associated with timestamp information and/or other contextual information (including parking) to store in the transportation database 113. In one embodiment in which timestamp information is available, for each travel or street segment of interest, the routing platform 105 retains the latest time at which a vehicle departed and estimate when the vehicle is or will arrive at the riding point.

In one embodiment, the routing platform 105 may present to the user information on points of interest, parking areas, road segments, and/or related information retrieved from the geographic database 119, while the user is traveling on different segments. In addition or alternatively, such information can be provided by the service platform 109, one or more services 109a-109m (also collectively referred to as services 109), one or more content providers 115a-115k (also collectively referred to as content providers 115), or a combination thereof. For example, the sources of the information may include map data, information inferred from data collected from participating vehicles, or a combination thereof.

In one embodiment, apart from an optimal or recommended candidate intermodal route, the routing platform 105 may also update the information as a map overlay that illustrates, for instance, timestamps, a number of alternate transport modes available, and fluctuations in the amount of alternate transport modes, etc. around the user location or position (e.g., a current location of the client UE 101), based on real-time transport data from the transportation database 113.

In one embodiment, vehicles 103 are equipped with a navigation device (e.g., a UE 101) that is capable of submitting to the routing platform 105 requests for routing the vehicle and of guiding of the vehicle respectively. In one embodiment, as the user and/or the vehicle follow the respective segments, the UE 101 (e.g., via a navigation application 111) and/or the vehicle 103 may iterate their locations with timestamps to the routing platform 105 in order to update the travel status in a real-time and/or substantially real-time manner while factoring in delay caused by traffic, weather, etc.

In one embodiment, a routing request can be triggered by interactions with a user interface of the UE 101 (e.g., an explicit request from a user without any vehicle or the user wanting the user's own vehicle), or automatically when inferring the user's need from user profile information and/or user context information. In yet another embodiment, the UE 101 can initiate a routing request when the UE 101 detects that the user mentions a meeting vehicle need in an email, calendar entry, web post, etc. In this way, vehicle information can be provided even when no explicit routing request is set or known by the system 100.

As shown in FIG. 1A, the routing platform 105 operates in connection with UEs 101 and vehicles 103 for optimizing intermodal route computations. By way of example, the UEs 101 may be any mobile computer including, but not limited to, an in-vehicle navigation system, vehicle telemetry device or sensor, a personal navigation device ("PND"), a portable navigation device, a cellular telephone, a mobile phone, a personal digital assistant ("PDA"), a wearable device, a camera, a computer and/or other device that can perform navigation or location based functions, i.e., digital routing and map display. In some embodiments, it is contemplated that mobile computer can refer to a combination of devices such as a cellular telephone that is interfaced with an on-board navigation system of an autonomous vehicle or physically connected to the vehicle for serving as the navigation system. Also, the UEs 101 may be configured to access a communication network 107 by way of any known or still developing communication protocols. Via this communication network 107, the UE 101 may transmit probe data as well as access various network based services for facilitating optimizing intermodal route computations.

Also, the UEs 101 may be configured with navigation applications 111 for interacting with one or more content providers 115, services of the service platform 109, or a combination thereof. Per these services, the navigation applications 111 of the UE 101 may acquire routing instructions, transport mode information, traffic information, mapping information and other data associated with the current locations of the user and the vehicle, etc. Hence, the content providers 115 and service platform 109 rely upon the gathering of user, vehicle, and transport modes trajectory data and routing data for executing the aforementioned services.

The UEs 101 and the vehicles 103 may be configured with various sensors 110 for acquiring and/or generating trajectory data regarding the user, a vehicle, other vehicles, conditions regarding the driving environment or roadway, etc. For example, sensors 110 may be used as GPS receivers for interacting with one or more satellites 117 to determine and track the current speed, position and location of a user and/or a vehicle travelling along a roadway. In addition, the sensors 110 may gather tilt data (e.g., a degree of incline or decline of the vehicle during travel), motion data, light data, sound data, image data, weather data, temporal data and other data associated with UEs 101 and/or the vehicle 103 thereof. Still further, the sensors 110 may detect local or transient network and/or wireless signals, such as those transmitted by nearby devices during navigation of a vehicle along a roadway. This may include, for example, network routers configured within a premise (e.g., home or business), another UE 101 or vehicle 103 or a communicable traffic system (e.g., traffic lights, traffic cameras, traffic signals, digital signage). In one embodiment, the routing platform 105 aggregates probe data gathered and/or generated by the UEs 101 and/or the vehicle 103 resulting from the driving of multiple different vehicles over a road/travel network. The probe data may be aggregated by the routing platform 105 to optimizing intermodal route computations.

By way of example, the routing platform 105 may be implemented as a cloud based service, hosted solution or the like for performing the above described functions. Alternatively, the routing platform 105 may be directly integrated for processing data generated and/or provided by service platform 109, content providers 115, and/or applications 111. Per this integration, the routing platform 105 may perform candidate intermodal routes calculation based on user/vehicle trajectory information and/or public transport information.

By way of example, the communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the UEs 101, the vehicles 103, the routing platform 105, the service platform 109, and the content providers 115 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

FIG. 1B is a diagram of the transportation database 113, according to one embodiment. In one embodiment, vehicle information, an intermodal vehicle availability model, and/or any other information used or generated by the system 100 with respect to optimizing intermodal route computations based on routing data 121 stored in the transportation database 113, and associated with and/or linked to the geographic database 119 or data thereof.

In one embodiment, the routing data 121 include modes of transport data 123, modes of transport availability data 125, traffic data 127, user profile data 129, user context data 131, indexes 133 of the routing data, etc.

In one embodiment, the modes of transport data 123 can include any public transport data and vehicle data used by the routing platform 105. The public transport data includes, but not limited to public transport type data, public transport schedule data, public transport route and stop data, real-time public transport trajectory data, etc. retrieved from transit agencies, public transportation operators, etc. The vehicle data includes, but not limited to vehicle type data, vehicle ownership data, vehicle route and step data, real-time vehicle trajectory data, parking instance data, timestamp information for the parking instance data, etc. for estimating a riding point and an estimated arrival time for a vehicle to the riding point and then the destination.

The public transport data format may be in General Transit Feed Specification (GTFS), REST/XML, or other industry standards for publishing transportation network and schedule data. In one embodiment, the public transport include on-demand services (e.g., taxis, shared vehicles, etc.) and fixed-route services such as city buses, trolley-buses, trams (or light rail) and passenger trains, rapid transit (metro/subway/underground, etc.), ferries, airlines, coaches, intercity rail, etc.

In one embodiment, the modes of transport availability data 125 includes shared vehicle availability data for one or more geographic areas, a shared vehicle availability pattern for each of the one or more geographic areas, an intermodal vehicle availability model, etc. By way of examples, the one or more modes of transport include a car, a bicycle, an electric bicycle, a scooter, a mini scooter, a public transport, a ride hailing service, etc. In one embodiment, a boundary of the one or more geographic areas is determined by a block size, a shared vehicle density, a geographical district, a geofence, or a combination thereof.

In one embodiment, the shared vehicle availability data includes historical shared vehicle availability data collected from the one or more geographic areas over a period time, and the shared vehicle availability data is associated with one or more modes of transport that can be used to generate an intermodal route.

In one embodiment, the shared vehicle availability pattern indicated by a metric indicating a count of shared vehicles available per said each geographic area.

In one embodiment, the intermodal vehicle availability model is generated before receiving a request to generate the intermodal route and based on the shared vehicle availability pattern, and the intermodal vehicle availability model indicates a possible combination of the one or more modes of transport for said each geographic area.

In one embodiment, the traffic data 127 includes, but not limited to, travel speeds, congestions, detours, vehicle types and volumes, accidents, road conditions, road works, etc. on specific road segments.

In one embodiment, the user profile data 129 includes, but not limited to, the name, name, login named, screen named, nicknamed, handle names, home addresses, email addresses, government identification numbers, operator license/credential types (motorcycle, regular passenger vehicle, commercial vehicle, etc.), vehicle registration plate numbers, face, fingerprints, handwriting, credit card numbers, digital identities, date of birth, age, birthplace, genetic information (e.g., gender, race, etc.), telephone numbers, marriage status/records, criminal records, purchase records, financial data, activity records, employment records, insurance records, medical records, political and non-political affiliations, preferences (e.g., POIs), calendar data, driving history data, vehicle sharing data, etc. of the driver/requesting user.

In one embodiment, the user context data 131 includes, but not limited to, a destination of the requesting user, a type of the destination of the user, a proximity of the user location to a riding point or the destination, availability of an alternate destination for the user, a number of passengers accompanying the user, weather data in the vicinity of the user, etc.

In one embodiment, the modes of transport data 123 can be used in junction with the user profile data 129 and the user context data 131 for estimating a riding point and an estimated arrival time for the user to arrive the riding point. In another embodiment, the traffic data 127 is further included for estimating the riding point and the estimated arrival time for the user to arrive the riding point.

In one embodiment, the modes of transport availability data 125 can be used in junction with the user profile data 129 and the user context data 131 to generate the intermodal route. In another embodiment, the traffic data 127 is further included to generate the intermodal route.

More, fewer or different data records can be provided in the transportation database 113. One or more portions, components, areas, layers, features, text, and/or symbols of the routing data records in the transportation database 113 can be stored in, linked to, and/or associated with one or more of the data records of the geographic database 119 (such as mapping and/or navigation data).

In one embodiment, the geographic database 119 includes geographic data used for (or configured to be compiled to be used for mapping and/or navigation-related services, such as for route information, service information, estimated time of arrival information, location sharing information, speed sharing information, and/or geospatial information sharing, according to exemplary embodiments. For example, the geographic database 119 includes node data records, road segment or link data records, POI data records, parking availability data records, the routing data 121, and other data records.

In exemplary embodiments, the road segment data records are links or segments representing roads, streets, or paths, as can be used in the calculated route or recorded route information. The node data records are end points corresponding to the respective links or segments of the road segment data records. The road link data records and the node data records represent a road network, such as used by vehicles, cars, and/or other entities. Alternatively, the geographic database 119 can contain path segment and node data records or other data that represent pedestrian paths or areas in addition to or instead of the vehicle road record data, for example.

The road link and nodes can be associated with attributes, such as geographic coordinates, street names, address ranges, speed limits, turn restrictions at intersections, and other navigation related attributes, as well as POIs, such as traffic controls (e.g., stoplights, stop signs, crossings, etc.), gasoline stations, hotels, restaurants, museums, stadiums, offices, automobile dealerships, auto repair shops, buildings, stores, parks, etc. The geographic database 119 can include data about the POIs and their respective locations in the POI data records. The geographic database 119 can also include data about places, such as cities, towns, or other communities, and other geographic features, such as bodies of water, mountain ranges, etc.

The transportation database 113 and/or the geographic database 119 can be maintained by the content provider in association with the service platform 109 (e.g., a map developer). The map developer can collect driving/parking data and geographic data to generate and enhance the transportation database 113 and/or the geographic database 119. There can be different ways used by the map developer to collect data. These ways can include obtaining data from other sources, such as municipalities or respective geographic authorities.

The transportation database 113 and/or the geographic database 119 can be stored in a format that facilitates updating, maintenance, and development of the relevant data. For example, the data in the transportation database 113 and/or the geographic database 119 can be stored in an Oracle spatial format or other spatial format. The Oracle spatial format can be compiled into a delivery format, such as a geographic data files (GDF) format to be compiled or further compiled to form geographic database products or databases, which can be used in end user navigation devices or systems.

As mentioned above, the transportation database 113 and the geographic database 119 are separated databases, but in alternate embodiments, the transportation database 113 and the geographic database 119 are combined into one database that can be used in or with end user devices (e.g., UEs 101) to provide navigation-related functions and provide shared vehicle information. For example, the databases 113, 119 are assessible to the UE 101 directly or via the routing platform 105. In another embodiments, the databases 113, 119 can be downloaded or stored on UE 101, such as in applications 111.

Figure 2:
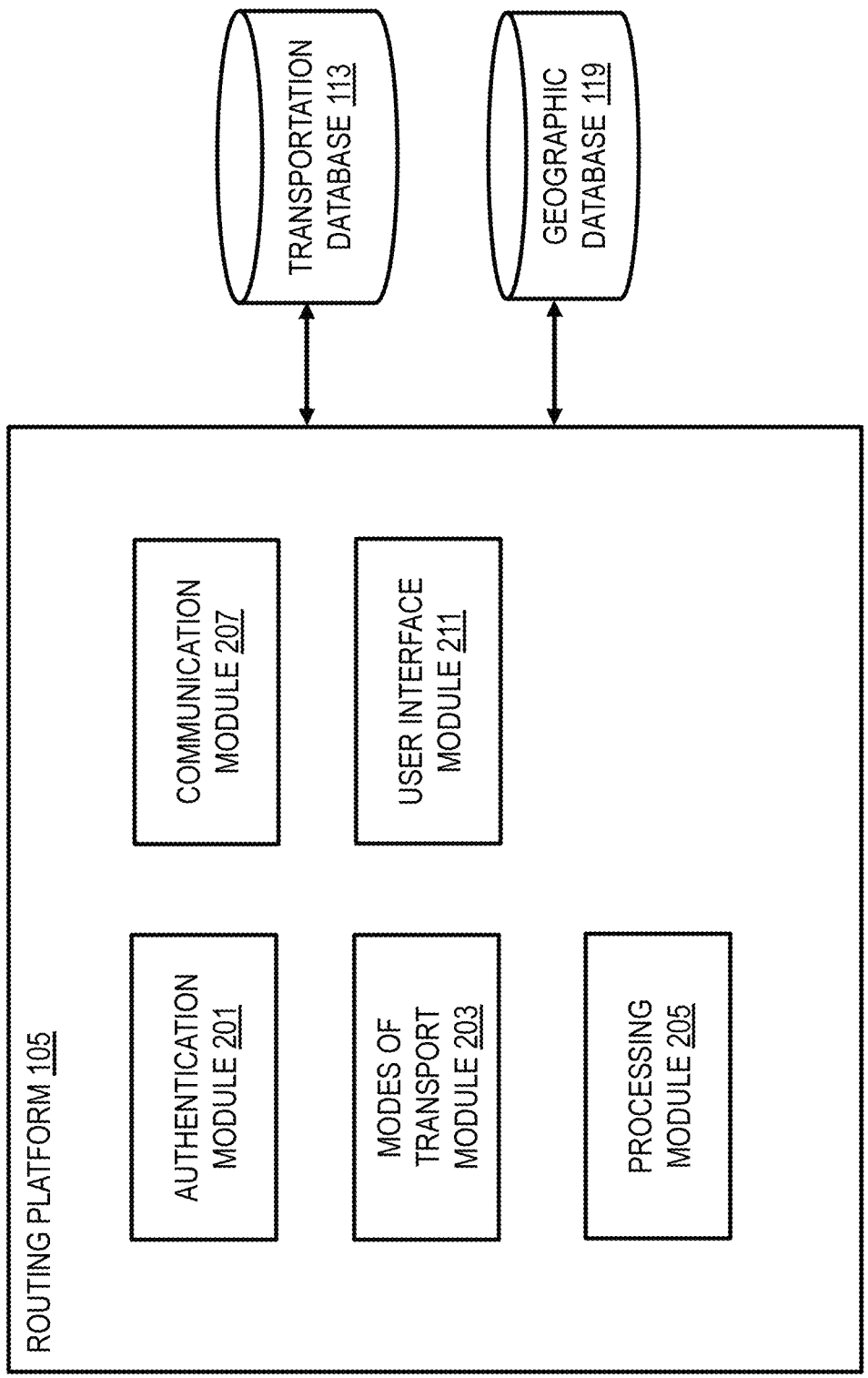
FIG. 2 is a diagram of the components of a routing platform, according to one embodiment.

FIG. 2 is a diagram of the components of a routing platform, according to one embodiment. By way of example, the routing platform 105 includes one or more components for optimizing intermodal route computations. It is contemplated that the functions of these components may be combined or performed by other components of equivalent functionality. In this embodiment, the routing platform 105 includes an authentication module 201, a modes of transport module 203, a processing module 205, a communication module 207, and a user interface module 209.

In one embodiment, the authentication module 201 authenticates UEs 101 and/or associated vehicles 103 for interaction with the routing platform 105. By way of example, the authentication module 201 receives a request to access the routing platform 105 via an application 111. The request may be submitted to the authentication module 201 via the communication module 207, which enables an interface between the navigation application 111 and the platform 105. In addition, the authentication module 201 may provide and/or validate access by the UE 101 to upload trajectory data, and/or other location-based information to the platform 105. In one embodiment, the authentication module 201 may further be configured to support and/or validate the formation of profile by a provider of a service 109 or content provider 115, e.g., for supporting integration of the capabilities for optimizing intermodal route computations with said providers 115 or services 109.

The modes of transport module 203 retrieves the modes of transport data 123 (including fixed-route and/or on-demand transports and associated schedules and timestamps) from various sources such as the transportation database 113, transit agencies, transportation operators, etc. In one embodiment, the modes of transport module 203 aggregates schedules of various transport that are operated on fixed schedules. In another embodiment, the modes of transport module 203 analyzes trajectory data (including associated timestamps) uploaded by one or more authenticated passenger UE 101 and/or various transport operators to determine the status of the transports that operate on demand. In one embodiment, the modes of transport module 203 may receive other related data along with the trajectory data or segment lists such as acceleration, road curvature, vehicle tilt, driving mode, brake pressure, etc. It then stores the received data to database 113 optionally in association with a unique identifier of the various transport that transmitted the trajectory data.

In one embodiment, the processing module 205 retrieves historical trajectory data (including associated timestamps) uploaded by one or more authenticated passenger UE 101 and/or various transport operators from various sources such as the transportation database 113, transit agencies, transportation operators, etc., and generates an intermodal vehicle availability model.

In on embodiment, the processing module 205 analyzes the historical trajectory data and the associated timestamps to extract shared vehicle availability data for geographic areas. The vehicle availability data includes historical vehicle availability data collected from the geographic areas over a period time, and the vehicle availability data is associated with different modes of transport that can be used to generate an intermodal route. FIGS. 3A-3D are diagrams of user interfaces used in the processes for optimizing intermodal route computations, according to various embodiments.

Figure 3A:
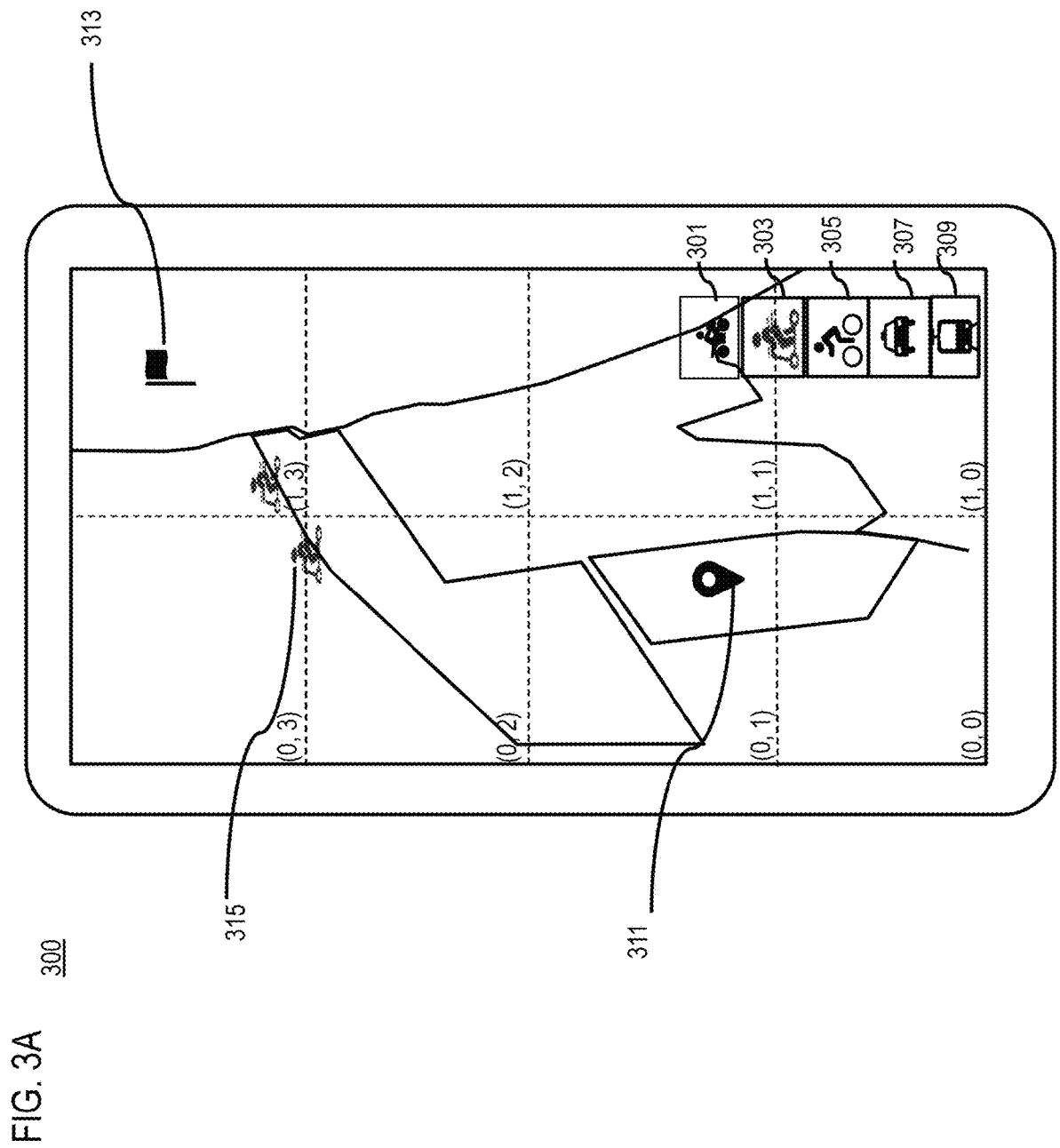
FIGS. 3A-3D are diagrams of user interfaces used in the processes for optimizing intermodal route computations, according to various embodiments.

By way of example, a user interface (UI) 300 in FIG. 3A presents transport icons 301, 303, 305, 307, 309 of various transport modes, a user location 311, and a destination 313. When the system 100 and/or the user selects icon 403, the historical trajectory data of a fleet of e-scooters of Operator A is analyzed for downtown Washington D.C. per block (e.g., of 200 meters by 200 meters), to determine a shared vehicle availability pattern for each of the blocks (0, 0)-(1, 3) as a function of time.

In one embodiment, the shared vehicle availability pattern indicated by a metric indicating a count of shared vehicles available per said each geographic area over a period of time (e.g., one or more hours, a time period of a day, a particular day of a week, a particular working day/holiday in a month, a particular season, six months, one year, etc.). Only two e-scooters 315 ever presented in blocks (0, 2), (0, 3), (1, 3) over the period of time. In this example, the metric for (0, 2), (0, 3), (1, 3) at Friday 3:00 pm over the period of time is 0.5, 0.5, 1 respectively, and the metric for the remaining blocks over the period of time is 0. In another embodiment, the shared vehicle availability pattern indicated by a metric indicating a count of shared vehicles available per said each geographic area per different environmental parameters, such as visibility, weather, etc. For example, in the morning time in winter with snow, there may be few shared cars available, yet plenty of shared bicycles available. As another example, in early afternoon of a spring sunny day, lots of shared cars may be available, yet few shared bikes available. The processing module 205 considers these finer time windows to accommodate intermodal routing, for example, for a route that will take place at a given time point and with a limited duration—in city traffic, maximum 2 hours.

Figure 3B:
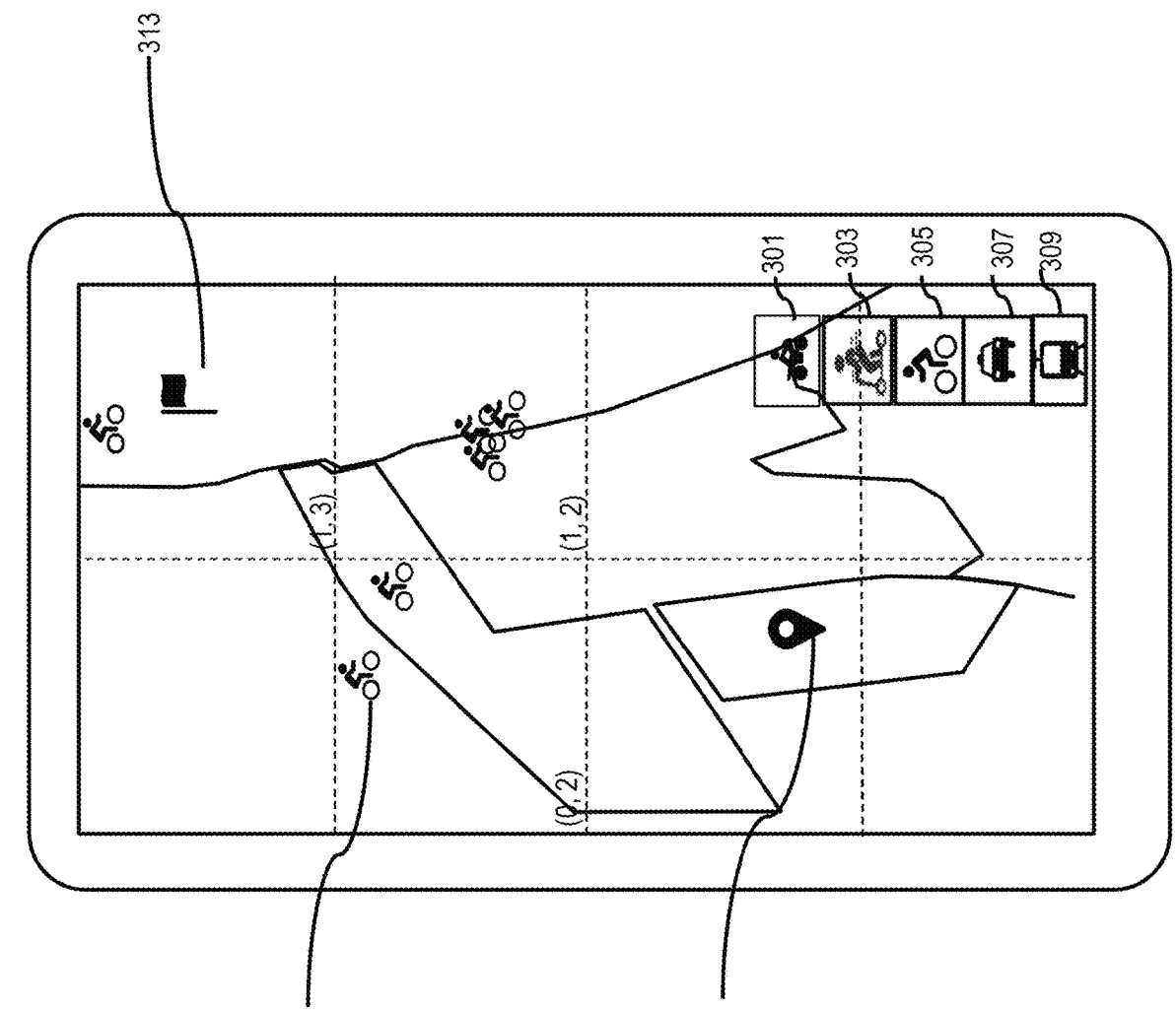

In another embodiment, the shared vehicle availability pattern indicated by a metric indicating an average count of shared vehicles available per said each geographic area at a given moment (e.g., Friday 3:00 pm) over a period of time. As another example, a UI 320 in FIG. 3B shows averagely six bicycles 321 present in blocks (0, 2), (1, 2), (1, 3) at the given moment, based on the historical trajectory data of a fleet of bicycles of Operator B over the period of time. In this example, the metric for (0, 2), (1, 2), (1, 3) at Friday 3:00 pm over the period of time is 2, 3, 1 respectively, and the metric for the remaining blocks at Friday 3:00 pm over the period of time is 0.

Instead of a given time of a weekday, such as given moment can be further defined by a particular private or public holiday (e.g., birthday, film festival, new year eve, etc.), a particular private or public event (e.g., Super Bowl), a particular month (e.g., May), a particular season (e.g., spring), etc.

Instead of a grid approach with blocks, the system 100 petitions the areas using Voronoi segmentation or the like, which partitions a region into areas based on distance to points in a specific subset of the region. That set of points (called seeds, sites, or generators) is specified beforehand, and for each seed there is a corresponding region consisting of all points closer to that seed than to any other.

In one embodiment, the intermodal vehicle availability model is generated before receiving a request for an intermodal route, in order to generate the intermodal route based on the vehicle availability patterns, and the intermodal vehicle availability model indicates a possible combination of the modes of transport for each geographic area over the period of time.

Figure 3C:
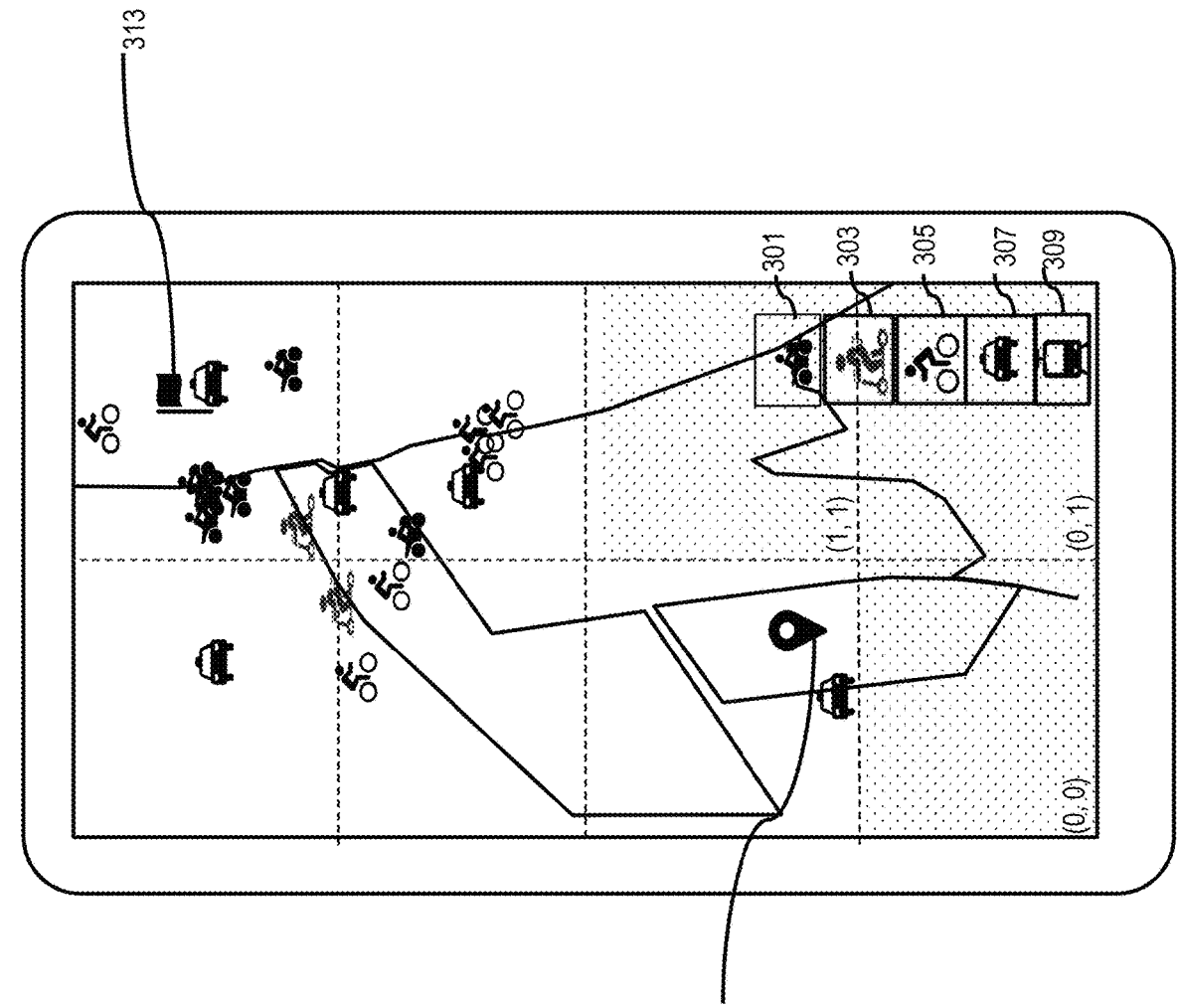
Figure 3D:
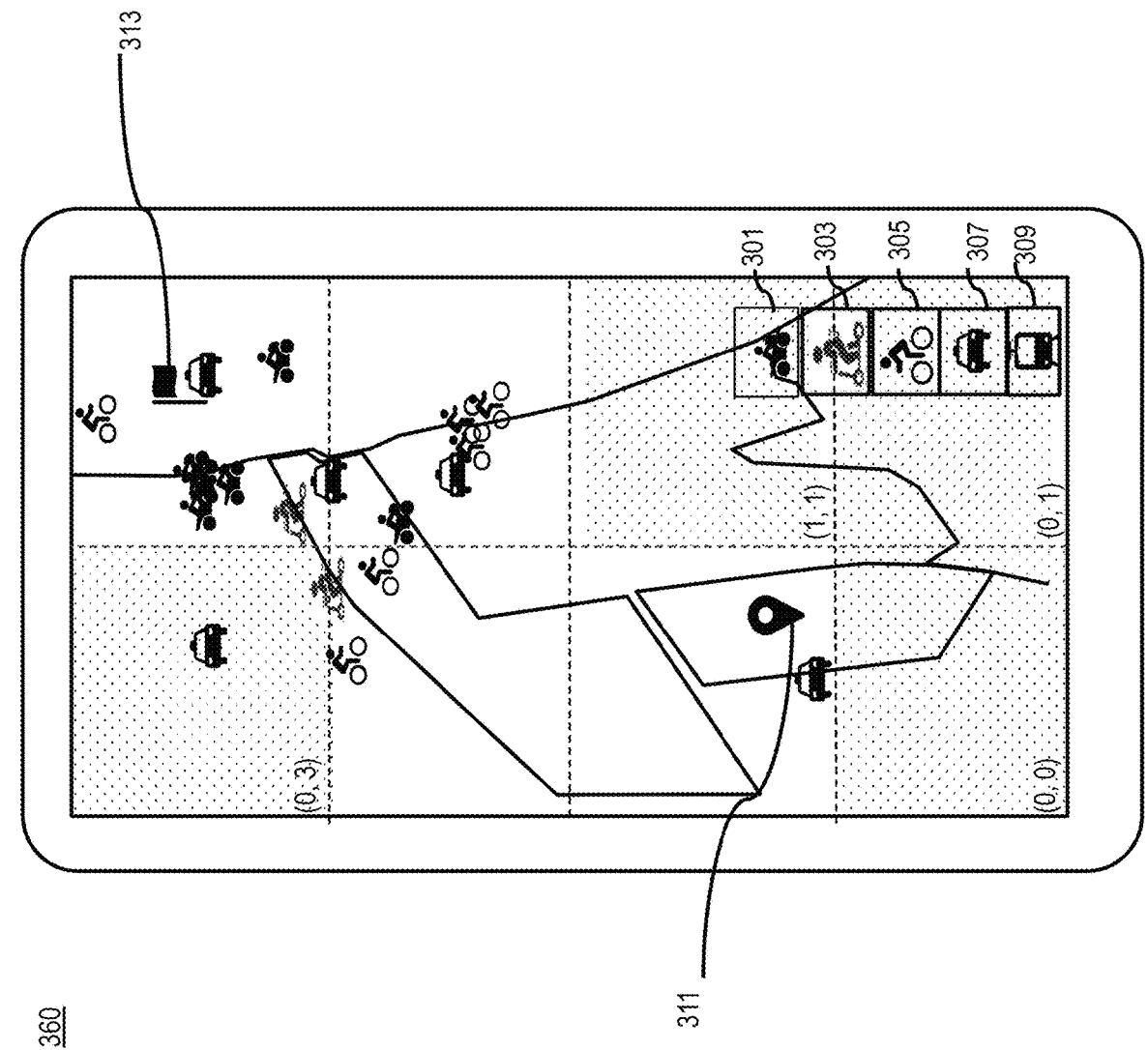

Further to the examples in FIGS. 3A-3B, a user interface (UI) 340 in FIG. 3C presents modes of transport include a motorcycle, an e-scooter, a bicycle, a car, and a public transport in all blocks except (0, 0), (1, 0), (1, 1), based on the historical trajectory data of the modes of transport at the same given moment over the period of time. In one embodiment, the system 100 generates an intermodal vehicle availability model by aggregating the shared vehicle availability patterns of the modes of transport for each block, and excludes/masks (0, 0), (1, 0), (1, 1) in a dot pattern from the intermodal vehicle availability model for this given moment (e.g., Friday afternoon 3:00 pm) in FIG. 3C.

In another embodiment, the modes of transport further include an electric bicycle, a mini scooter, a ride hailing service, etc.

The possible combination of the modes of transport in each block is represented by a transport mode matrix per mode of transport in the format of: [a motorcycle count, an e-scooter count, a bicycle count, a car count, and a public transport count] shown as Table 1 as follows:

TABLE 1

| Block Count Matrix | (0, 1) | (0, 2) | (0, 3) | (1, 2) | (1, 3) |
|---|---|---|---|---|---|
| | [0, 0, 0, 1, 0] | [0, 0.5, 2, 0, 0] | [0, 0, 0.5, 1, 0] | [1, 0, 3, 1.5, 0] | [4, 1, 1, 1.5, 0] |

The transport mode matrix links a first set of the transport modes that can used for a first leg of the intermodal route terminating in said each geographic area and a second set of the one or more transport modes that can be used to continue onto a second leg of the intermodal route from said each geographic area. Since block (0, 1) contains only one mode of transport (i.e., a car), it may be excluded from the intermodal vehicle availability model for this given moment (e.g., Friday afternoon 3:00 pm). However, block (0, 1) contains the user location, thus should not be excluded from the intermodal vehicle availability model. As defaults, a block contains the user location and/or the destination should not be excluded from the intermodal vehicle availability model.

The intermodal vehicle availability model indicates a possible combination of the modes of transport for each geographic area over the period of time is shown as a matrix in Table 2 as follows:

TABLE 2

| Block Count Matrix | (0, 1) | (0, 2) | (0, 3) | (1, 2) | (1, 3) |
|---|---|---|---|---|---|
| | [0, 0, 0, 1, 0] | [0, 0.5, 2, 0, 0] | [0, 0, 0.5, 1, 0] | [1, 0, 3, 1.5, 0] | [4, 1, 1, 1.5, 0] |

In another embodiment, the processing module 205 flags one or more of the geographic areas in Table 2 as not suitable for generating the intermodal modal route based on determining that the metric is below a threshold value for the geographic area, and excludes the one or more geographic areas from the intermodal vehicle availability model in Table 2, thereby from the computations to generate the intermodal route. By way of example, the processing module 205 calculates a product of the available counts per block, and sets the threshold value for the product as one. As such, block (0, 2) remains in the intermodal vehicle availability model since the product of 0.5 and 2 equals to one, while block (0, 3) is removed/masks in a dot pattern from the intermodal vehicle availability model as shown in a user interface (UI) 360 of FIG. 3D since the product of 0.5 and 1 is less than one.

Although the product of the counts in block (0, 1) is zero, block (0, 1) contains the user location, thus should not be excluded from the flagged intermodal vehicle availability model. Since the user location and the destination need to be included in an intermodal route, a block contain the user location or the destination should not be excluded from the flagged intermodal vehicle availability model. The flagged intermodal vehicle availability model shown as a matrix in Table 3 as follows:

TABLE 3

| Block | (0, 1) | (0, 2) | (1, 2) | (1, 3) |
|---|---|---|---|---|
| Count Matrix | [0, 0, 0, 1, 0] | [0, 0.5, 2, 0, 0] | [1, 0, 3, 1.5, 0] | [4, 1, 1, 1.5, 0] |
| Count product | 0 | 1 | 4.5 | 6 |

In one embodiment, the processing module 205 determines the intermodal route using intermodal routing algorithms, such as Dijkstra's algorithm, State Dependent ALT (SDALT), etc., upon the user location, the destination, and either the intermodal vehicle availability model or the flagged intermodal vehicle availability model. The ALT algorithm combines the characteristics of the A* algorithm, the use of landmarks, and the triangle inequality.

In another embodiment, the processing module 205 determines one or more updated destinations of the user and/or the modes of transport. For example, the user just receives a call from a friend requesting a pick up at an updated destination. The processing module 205 re-computes updated riding point for the vehicle using the intermodal vehicle availability model or the flagged intermodal vehicle availability model based on the one or more updated destinations, and provides data for indicating the one or more updated riding points to the vehicle.

In another embodiment, the processing module 205 re-computes the intermodal vehicle availability model or the flagged intermodal vehicle availability model based on one or more triggers, such as new public, commercial, industrial, residential developments (e.g., malls, school, housing development, government office), new transportation project (e.g., tunnels, bridges, highways, subways, ferries, ports, airports, etc.), road or waterline repairs, natural deserters, wild fire, earthquake, flood, etc. that will impact traffic patterns of the user and/or the modes of transport.

In another embodiment, the intermodal route further includes an option for the vehicle to travel to the user location (e.g., an autonomous vehicle, or a shared vehicle driven by another user) to pick up the user before proceeding to the destination.

In one embodiment, once the candidate intermodal route is determined, the processing module 205 can interact with the communication module 207 and/or the user interface module 209 to present to the user the candidate intermodal route. After the user selects the intermodal route, the processing module 205 can interact with the communication module 207 and/or the user interface module 209 to present to the user the transport modes and timing information, related navigation instructions, and/or other information related to the vehicle timing and vehicle navigation information.

The processing module 205 provides to the vehicle data of the candidate intermodal route and a respective riding location, and optionally the current transport mode and timing information of the user. In one embodiment, the processing module 205 provides to the vehicle related navigation instructions, and/or other information determined for the vehicle. In another embodiment, the vehicle uses its own on board system the generate navigation instructions and/or other information for the vehicle, based on the candidate intermodal route and the respective riding location.

Since there can be delays caused by traffic, weather, etc. for the user and/or the vehicle, the processing module 205 updates the user location, the vehicle location, or a combination thereof based on data from the transportation database 113 that is obtained via real-time monitoring by the system 100.

In one embodiment, the processing module 205 updates the candidate intermodal route and the respective riding location based on the updated user location and/or the updated vehicle location, or combination thereof.

It is further noted that the user interface module 209 may operate in connection with the communication module 207 to facilitate the exchange of real-time location information and/or transport mode information via the communication network 107 with respect to the services 109, content providers 115 and applications 111. Alternatively, the communication module 207 may facilitate transmission of the real-time location information and/or the transport mode information directly to the services 109 or content providers 115.

The above presented modules and components of the routing platform 105 can be implemented in hardware, firmware, software, or a combination thereof. Though depicted as a separate entity in FIG. 1A, it is contemplated that the platform 105 may be implemented for direct operation by respective UEs 101 and/or vehicles 103. As such, the routing platform 105 may generate direct signal inputs by way of the operating system of the UE 101 and/or vehicles 103 for interacting with the application 111. In another embodiment, one or more of the modules 201-209 may be implemented for operation by respective UEs 101 and/or vehicles 103 as a platform 105, cloud based service, or combination thereof.

Figure 4:
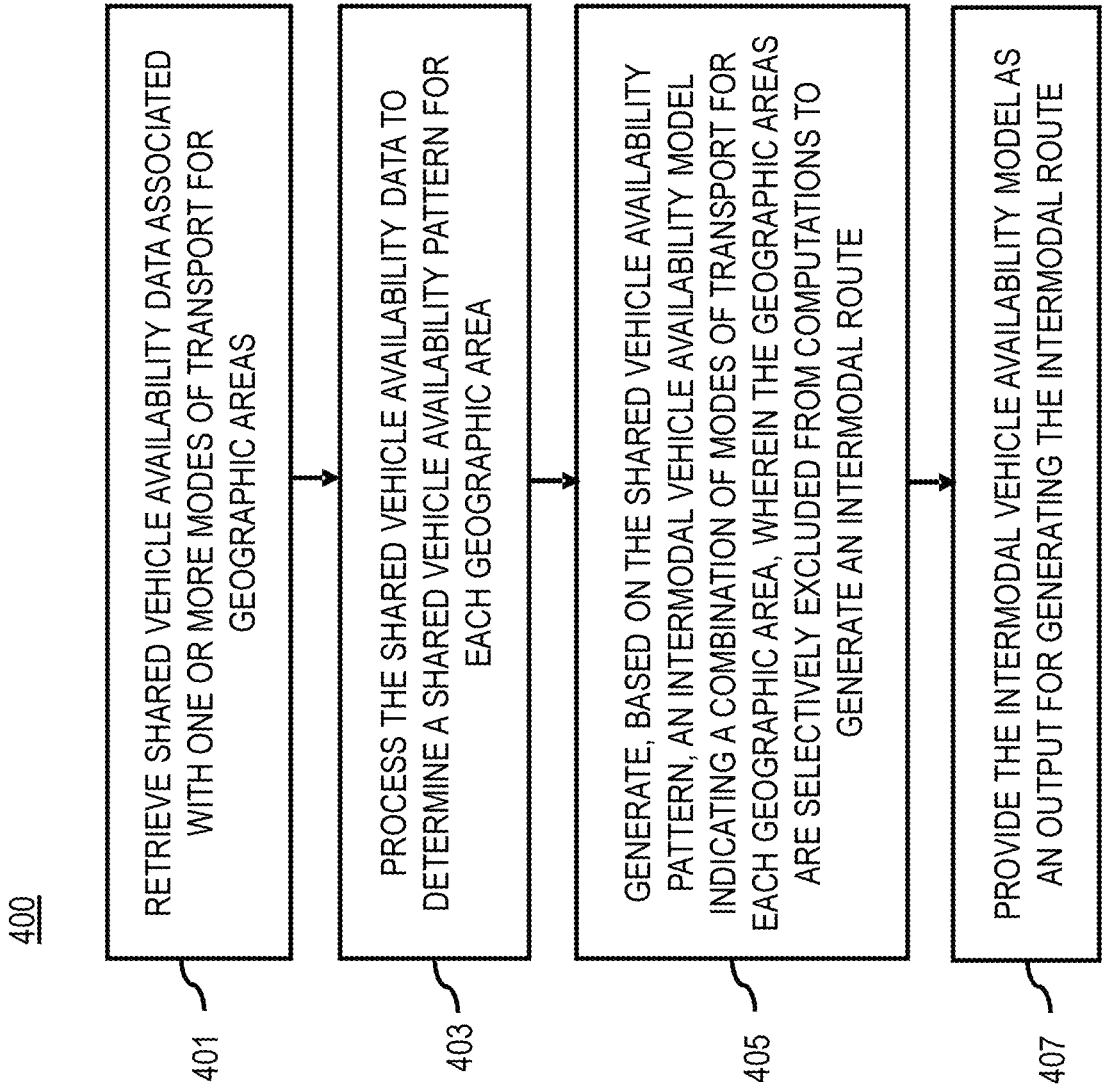
FIG. 4 is a flowchart of a process for optimizing intermodal route computations, according to one embodiment.
Figure 9:
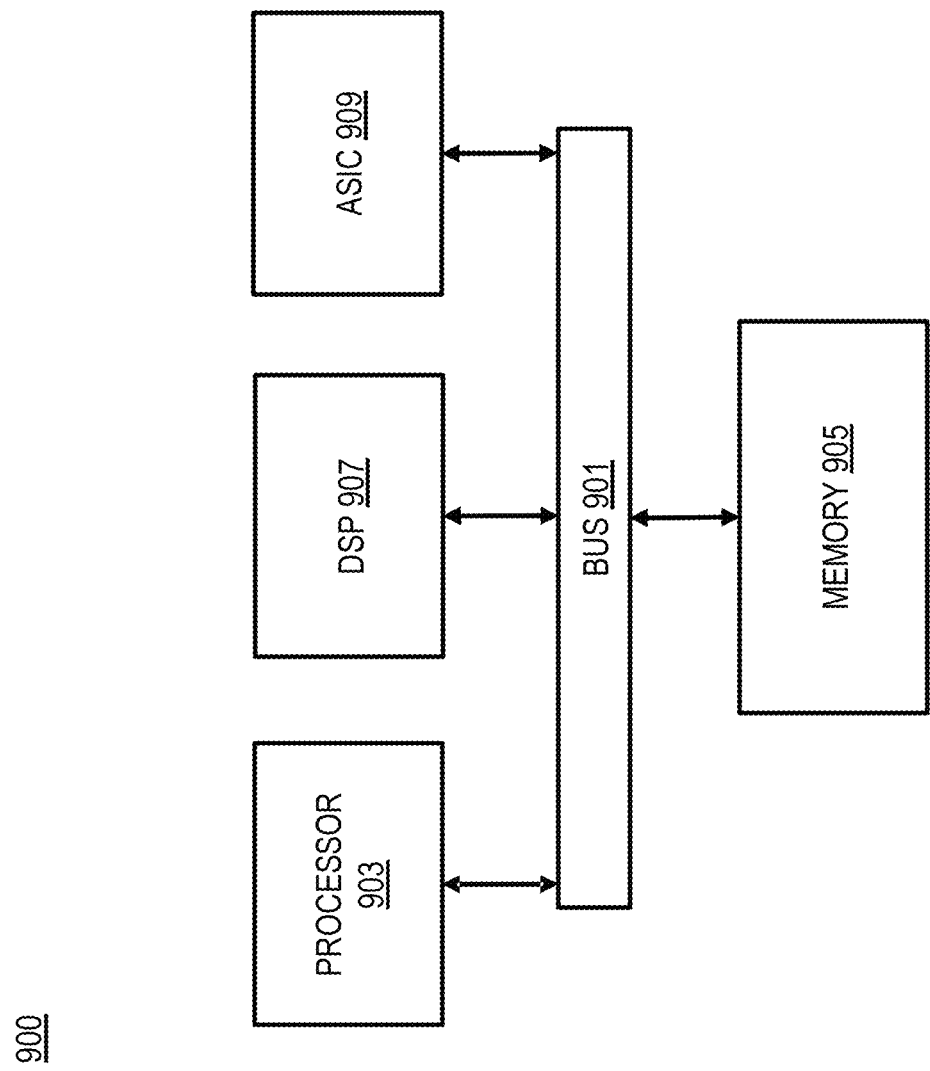
FIG. 9 is a diagram of a chip set that can be used to implement an embodiment of the invention.

FIG. 4 is a flowchart of a process for optimizing intermodal route computations, according to one embodiment. In one embodiment, the routing platform 105 performs the process 400 and is implemented in, for instance, a chip set including a processor and a memory as shown in FIG. 9. In addition or alternatively, all or a portion of the process 400 may be performed locally at the UE 101 and/or vehicle 103 (e.g., via the application 111 or another equivalent hardware and/or software component).

In step 401, the routing platform 105 retrieves shared vehicle availability data associated with one or more modes of transport for geographic areas. As discussed, the shared vehicle availability data is associated with one or more modes of transport that can be used to generate an intermodal route. The one or more modes of transport may include a car, a bicycle, an electric bicycle, a scooter, a mini scooter, a public transport, a ride hailing service, or a combination thereof.

In one embodiment, the boundary of the geographic areas is determined by a block size for the eight blocks (0, 0), (0, 1), (0, 2), (0, 3), (1, 0), (1, 1), (1, 2), (1, 3) shown in FIGS. 3A-3D. For example, the routing platform 105 determines an optimal block size for each geographical district (such as a town, a city, a county, etc.) using machine learning. As the numbers of shared vehicles and their operators vary, the routing platform 105 dynamically determines an optimal block size for each geographical district (such as a town, a city, a county, etc.) using updated data and models.

In another embodiment, the routing platform 105 determines the boundary of the geographic areas by a shared vehicle density. Density (k) can be defined as the number of vehicles per unit area of a geographical district. In general, shared vehicle densities are initially set by the operators via docking/parking space designation. On the other hand, the users ride the vehicles and controls the parking locations of dockless vehicles, which include offices, homes, restaurants, supermarkets, movie theaters, shopping malls, stadiums, museums, libraries, parks, etc. For example, the routing platform 105 partitions an area of a high vehicle density into smaller units until the number of shared vehicles therein is reduced to or below a threshold number, such as 30. By analogy, the routing platform 105 merges nearby areas of low vehicle densities into a bigger unit until the number of shared vehicles therein is increased to or above a threshold number, such as 30.

Figure 5:
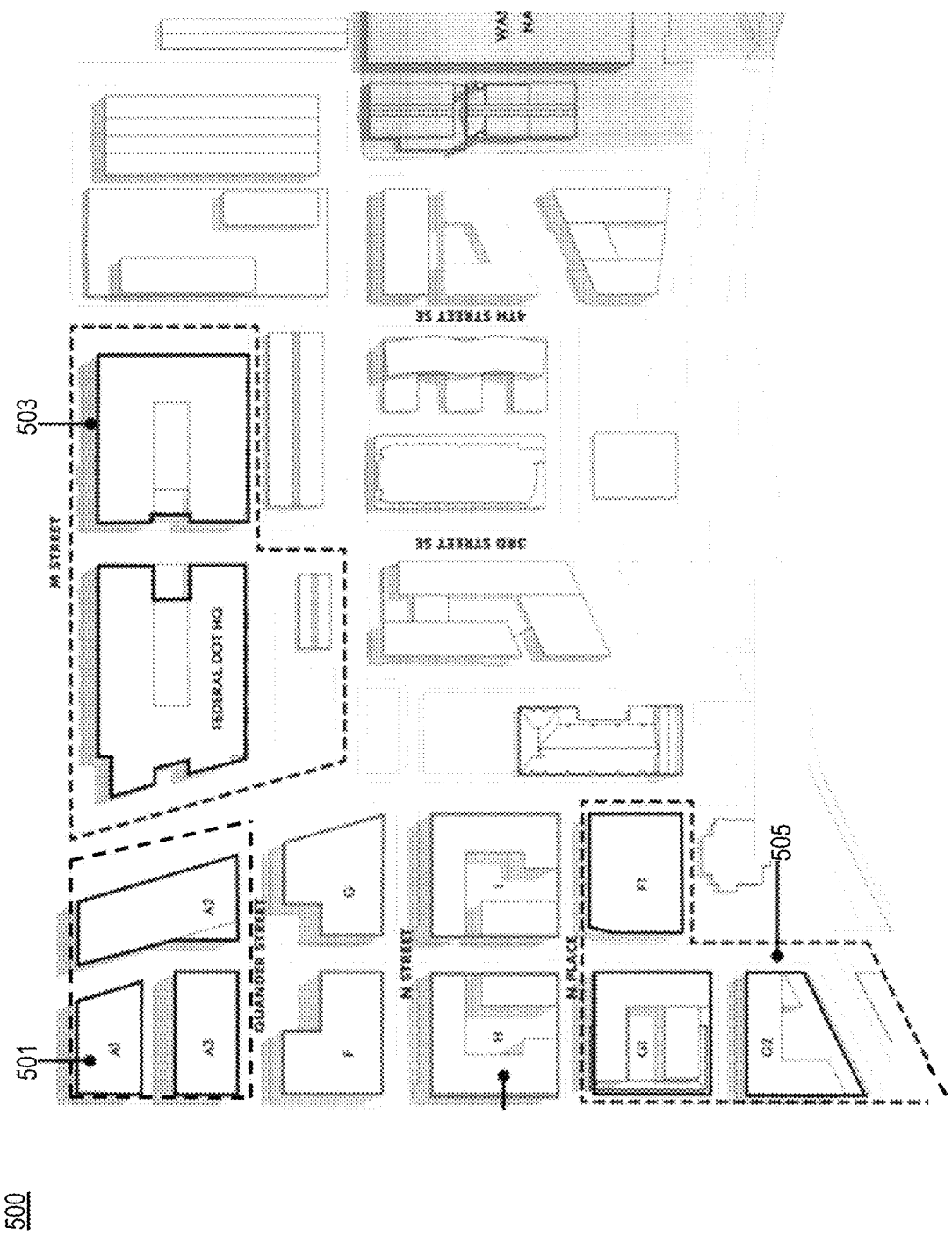
FIG. 5 is a diagram of a zoning map of Washington D.C. water front, according to one embodiment.

In another embodiment, the boundary of the geographic areas is determined by a geographical district, such as a street block, a zoning area, etc. FIG. 5 is a diagram of a zoning map of Washington D.C. water front, according to one embodiment. By way of example, the routing platform 105 defines different areas using different zoning areas, such as zoning area 501 including buildings A1, A2, A3, zoning area 503 including buildings of the Federal Department of Transposition headquarter, zoning area 505 including buildings F1, G1, G2, etc.

In another embodiment, the boundary of the geographic areas is determined by a geofence. For example, a geo-fence is a dynamically generated virtual perimeter for a real-world geographic area, such as in a radius around a point location. As another example, a geo-fence can be a predefined set of boundaries, such as mail and/or package delivery service zones or boundaries, shared vehicle operating zones or boundaries, etc.

In step 403, the routing platform 105 processes the shared vehicle availability data to determine a shared vehicle availability pattern for each geographic area. As discussed, the shared vehicle availability pattern for each geographic area (e.g., FIG. 3C) is aggregated from layers of different modes of transport (e.g., e-scooters in FIG. 3A, bicycles in FIG. 3B). For example, the routing platform 105 looks for the relevant areas at a reasonable distance from the destination and where user can find a parking space for the car easily, and where e-scooters have statistically been available.

In step 405, the routing platform 105 generates, based on the shared vehicle availability pattern, an intermodal vehicle availability model indicating a combination of modes of transport for each geographic area, wherein blocks (0, 0), (1, 0), (1, 1) are excluded from computations to generate an intermodal route.

Figure 6:
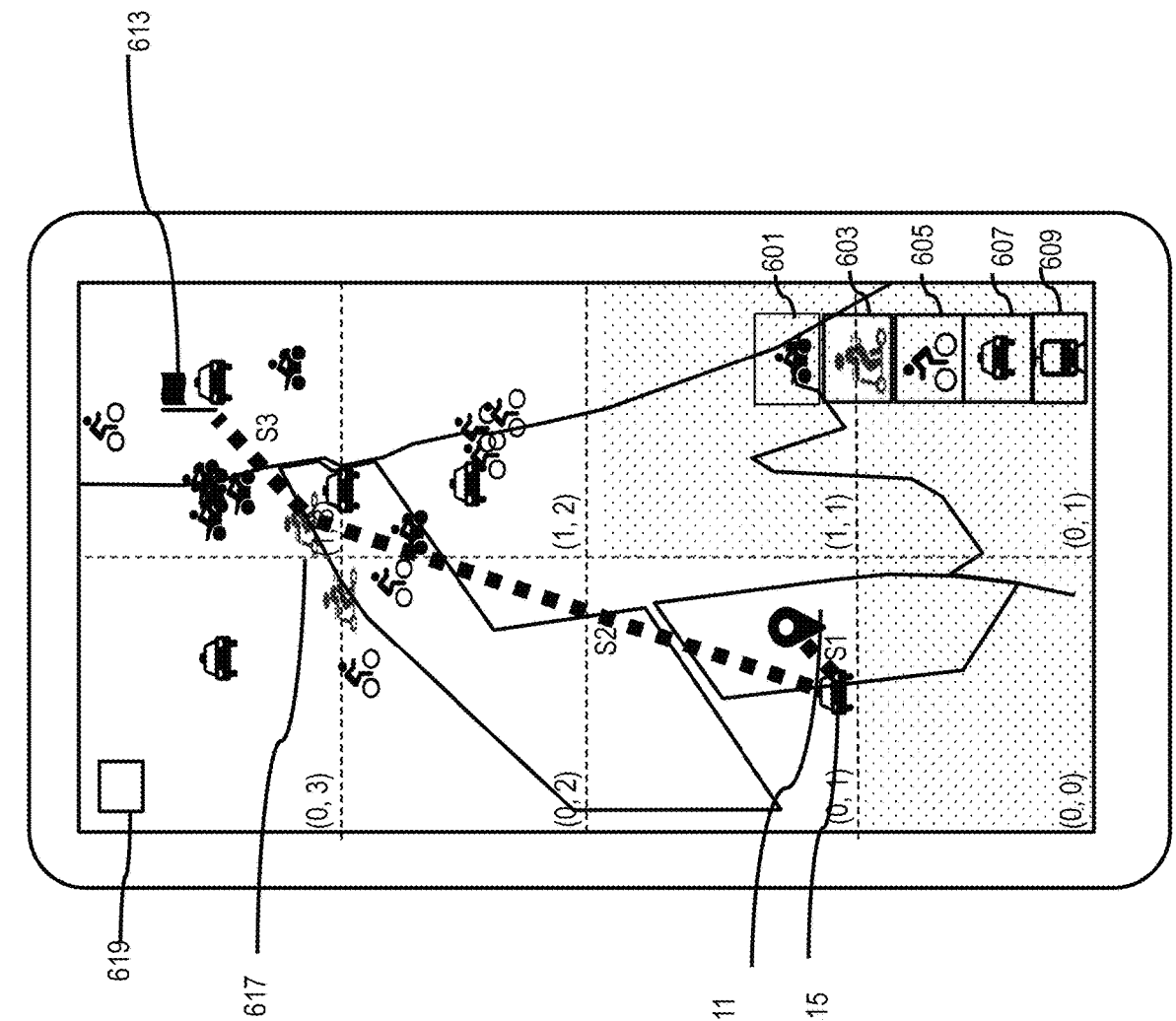
FIG. 6 is a diagram of a user interface used in the processes for providing an intermodal route, according to one embodiment.

In step 407, the routing platform 105 provides the intermodal vehicle availability model as an output for generating the intermodal route. The routing platform 105 then computes an intermodal route using modes of transport data from the transportation database 113 with the intermodal vehicle availability model. FIG. 6 is a diagram of a user interface used in the processes for providing an intermodal route, according to one embodiment.

By way of example, a user interface (UI) 600 in FIG. 6 that presents a motorcycle icon 601, an e-scooter icon 603, a bicycle icon 605, a car icon 607, and a public transport icon 609, a user location 611, a destination 613, and an intermodal route including three segments S1, S2, S3 connected at a car riding location 615 and an e-scooter riding location 617, according to one embodiment. In this example, the car riding location 615 is located in Block (1, 3), the e-scooter riding location 617 is located in blocks (0, 1), and three segments S1, S2, S3 are located in blocks (0, 1), (0, 2), (1, 2), (1, 3). As a result, the routing platform 105 efficiently and quickly computes a car+e-scooter route to the destination with less computation resource usage, such as less server usage, energy consumption, or even memory consumption, etc.

To simplify the discussion, FIG. 6 shows travel segments as straight lines instead of real-world road lines on a map. The segment "S1" is between the user location 601 and the car riding location 615, the segment "S2" is between the car riding location 615 and the e-scooter riding location 617, and the segment "S3" is between the e-scooter riding location 617 and the destination 613.

In other embodiments, the routing platform 105 computes the intermodal route further using traffic data, user profile and context data (including user preferences, e.g., comfort, vehicle models, vehicle seat numbers, cruise control, weather, people travelling with, things to carry, things/people to pick up, etc.) from the transportation database 113 with the intermodal vehicle availability model.

In another embodiment, the routing platform 105 computes the intermodal route based on a cost function including routing cost function parameter such as distance, fuel efficiency, etc. For example, such the intermodal route satisfies the requesting user's criteria (such as cost less than $15).

Figure 7:
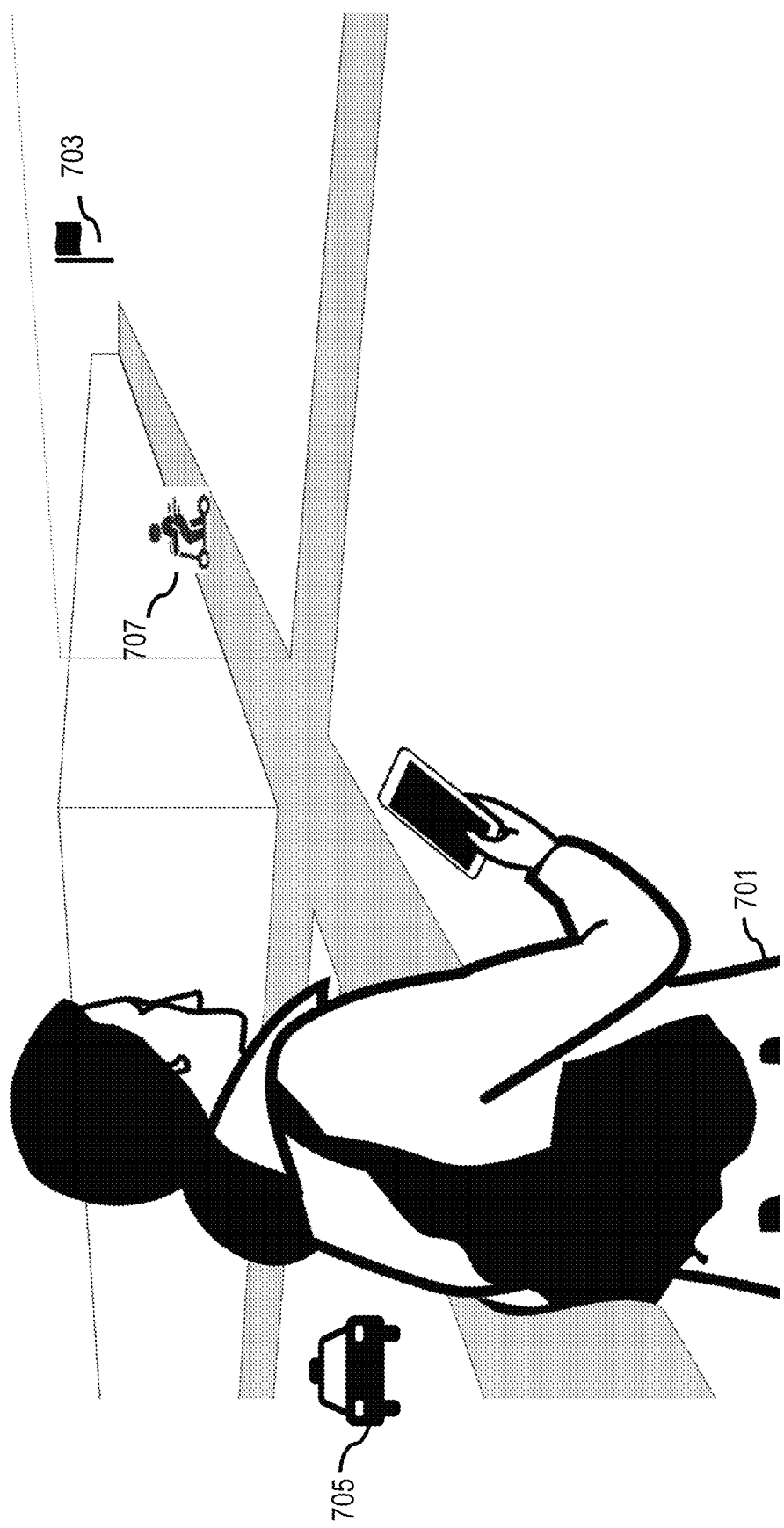
FIG. 7 is a diagram of a 3D user interface used in the processes for providing an intermodal route, according to one embodiment.

FIG. 7 is a diagram of a 3D user interface 700 used in the processes for providing an intermodal route, according to one embodiment. For example, upon the selection of a presentation switch icon 619 in FIG. 6, the presentation switches from the two-dimensional user interface 600 into a three-dimensional user interface 700 augmented with an human graphic FIG. 701, which can be a photo of the user, an avatar with the user's look, an avatar of other look, etc., that matches with the current user location 611 and orientation of the user in the physical world. The 3D user interface 700 is further augmented with a 3D destination graphic FIG. 703 that catches with the destination 613, a 3D car graphic FIG. 705 that matched with the car riding location 615, and a 3D e-scooter graphic FIG. 707 that matched with the e-scooter riding location 617.

The computation of the different embodiments mentioned previously can be done partially or totally on servers/cloud, or at the edge of the network in order to balance the network load/cellular usage.

The above-discussed embodiments allow users to optimize travel time, distance, and/or cost by considering the most efficient and cost effective combination of all possible transport mode (including walking, public transport, the user's own autonomous vehicle, shared vehicles, etc.), while excluding areas without available vehicles.

The above-discussed embodiments optimizes intermodal routing via further considering contextual factors such as traffic, user preferring e-scooters over bicycles, weather, things to carry, etc.

The above-discussed embodiments real-time monitor the travel status of the user and the vehicles and adjust the intermodal route accordingly (e.g., in case of traffic delays).

The above-discussed embodiments combine different technologies (sensors, predictive parking, probability computation, multimodal routing, machine learning, etc.) to provide a platform for mobility providers to share their data and get insights of candidate intermodal routes via combining many types of data sets, thereby determining intermodal vehicle availability models and conserves computation resources.

Car-sharing, ride-hailing and other mobility businesses need greater operational efficiency and user-centric applications. Using intermodal vehicle availability models, mobility providers can balance operational expansion with effectiveness while maintaining high-quality and price-sensitive services, and leverage sophisticated technology for fleet planning and trip analysis to help with cost reduction and service efficiency.

The processes described herein for optimizing intermodal route computations may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
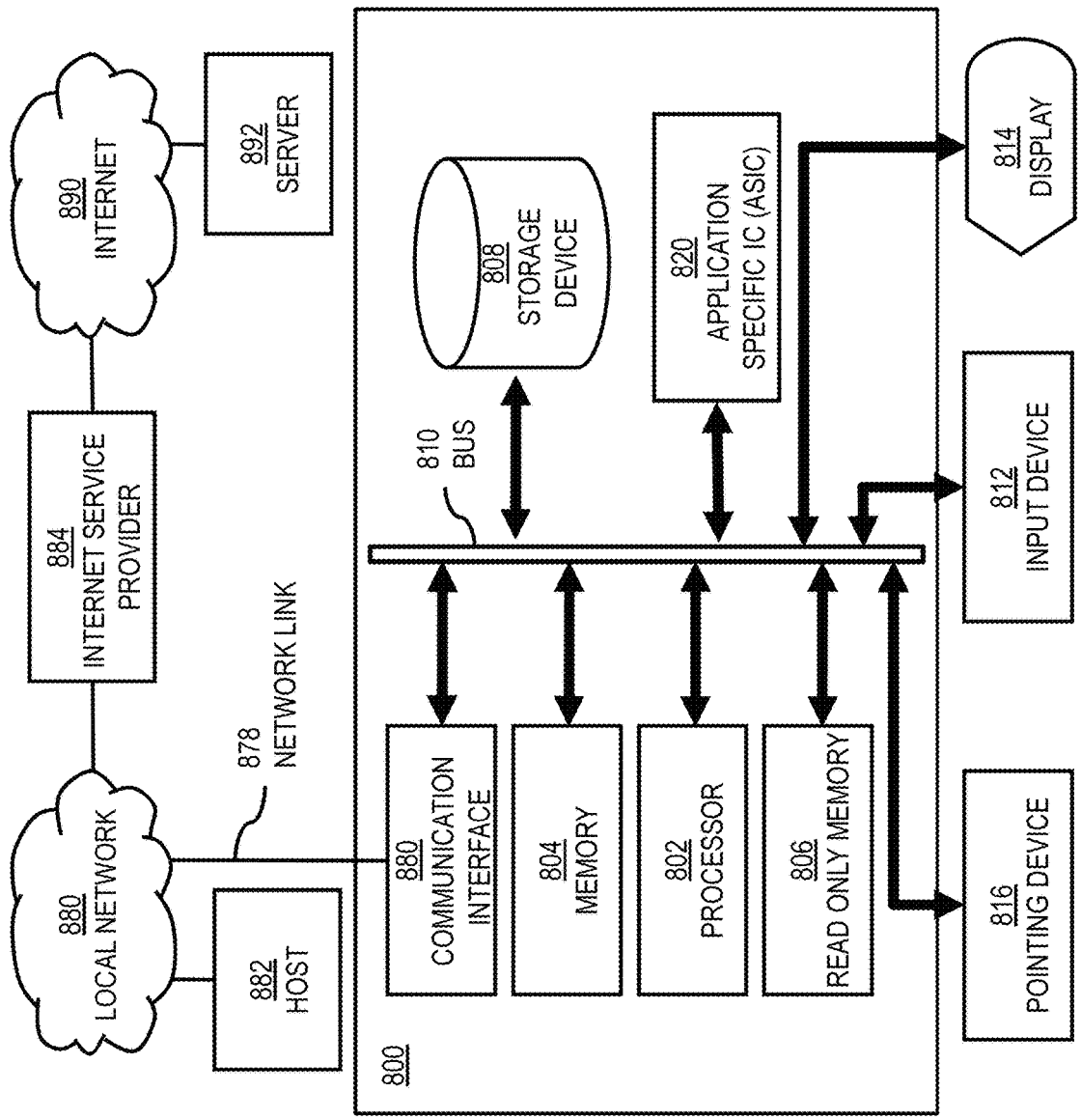
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipments (e.g., network elements, servers, etc.) within FIG. 8 can deploy the illustrated hardware and components of system 800. Computer system 800 is programmed (e.g., via computer program code or instructions) to provide shared vehicle availability detection and optimizing intermodal route computations based on vehicle trajectory information as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of optimizing intermodal route computations.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to optimizing intermodal route computations. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for optimizing intermodal route computations. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for optimizing intermodal route computations, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 880 coupled to bus 810. Communication interface 880 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 880 may be a parallel port or a serial port or a universal serial bus (USB) port on a personal computer. In some embodiments, communications interface 880 is an integrated services digital network (ISDN) card or a digital subscriber line (DSL) card or a telephone modem that provides an information communication connection to a corresponding type of telephone line. In some embodiments, a communication interface 880 is a cable modem that converts signals on bus 810 into signals for a communication connection over a coaxial cable or into optical signals for a communication connection over a fiber optic cable. As another example, communications interface 880 may be a local area network (LAN) card to provide a data communication connection to a compatible LAN, such as Ethernet. Wireless links may also be implemented. For wireless links, the communications interface 880 sends or receives or both sends and receives electrical, acoustic or electromagnetic signals, including infrared and optical signals, that carry information streams, such as digital data. For example, in wireless devices, such as mobile computers like vehicle infotainment system, the communications interface 880 includes a radio band electromagnetic transmitter and receiver called a radio transceiver. In certain embodiments, the communications interface 880 enables connection to the communication network 107 for optimizing intermodal route computations to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 880, carry information to and from computer system 800. Computer system 800 can send and receive information, including program code, through the networks 880, 890 among others, through network link 878 and communications interface 880. In an example using the Internet 890, a server host 892 transmits program code for a particular application, requested by a message sent from computer 800, through Internet 890, ISP equipment 884, local network 880 and communications interface 880. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 880 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to provide shared vehicle availability detection based on vehicle trajectory information as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of optimizing intermodal route computations.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide shared vehicle availability detection based on vehicle trajectory information. The memory 905 also stores the data associated with or generated by the execution of the inventive steps.

Figure 10:
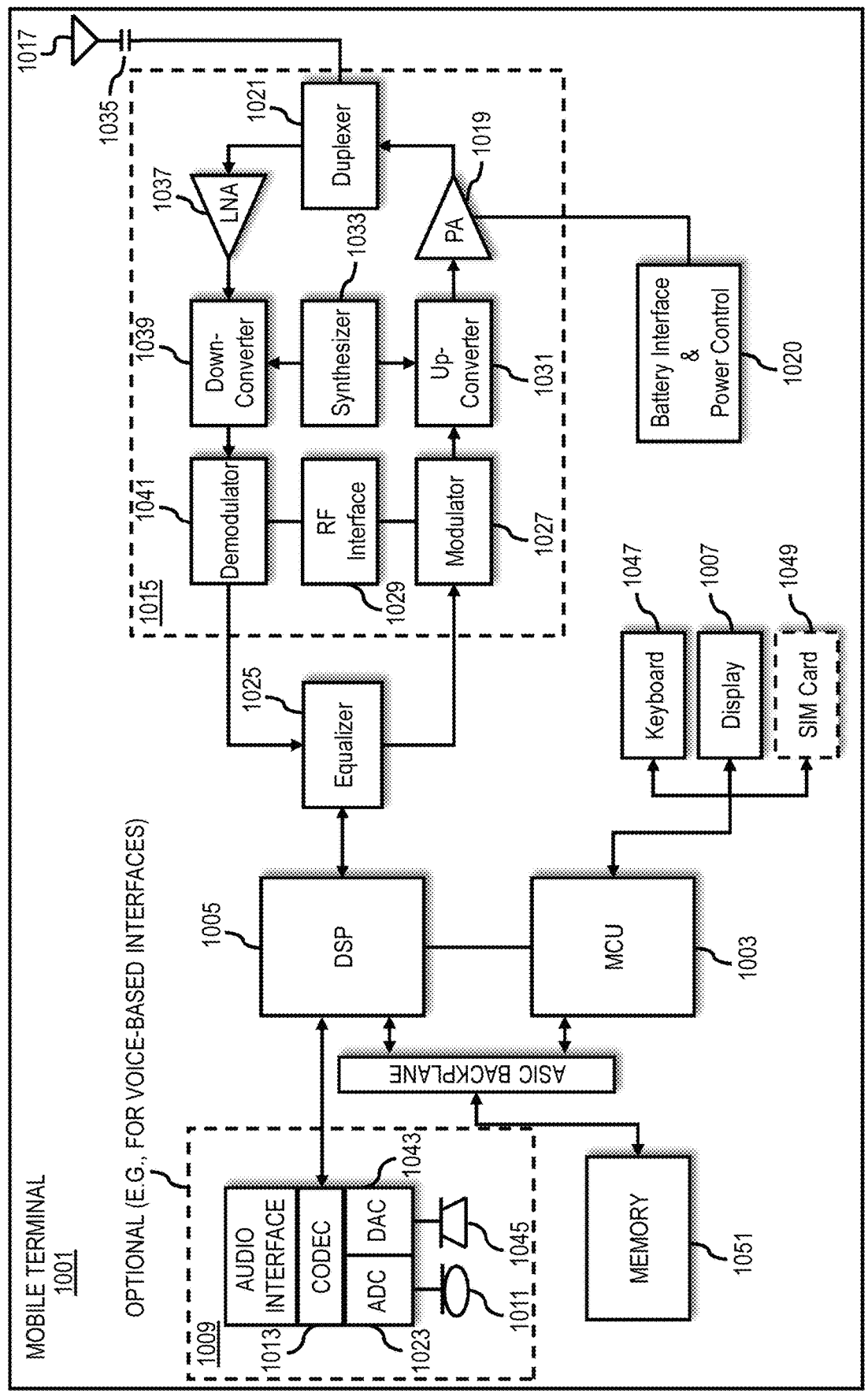
FIG. 10 is a diagram of a mobile terminal (e.g., mobile computer) that can be used to implement an embodiment of the invention.

FIG. 10 is a diagram of exemplary components of a mobile terminal (e.g., mobile computers such as vehicle infotainment system, vehicle embedded system, smartphones, etc.) for communications, which is capable of operating in the system of FIG. 1, according to one embodiment. In some embodiments, mobile terminal 1001, or a portion thereof, constitutes a means for performing one or more steps of optimizing intermodal route computations. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile computer or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile computer or a similar integrated circuit in network device (e.g., a cellular network device or data other network devices).

Pertinent internal components of the mobile terminal include a Main Control Unit (MCU) 1003, a Digital Signal Processor (DSP) 1005, and a receiver/transmitter unit. In one embodiment, wherein voice-based interaction and/or communications are supported at the mobile terminal, the mobile terminal may also include a microphone gain control unit and a speaker gain control unit. A main display unit 1007 provides a display to the user in support of various applications and mobile terminal functions that perform or support the steps of optimizing intermodal route computations. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. In embodiments supporting voice-based interactions and/or communications, an audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station (e.g., data and/or voice communications), which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, data to support optimizing intermodal route computations is formatted into network packets (e.g., Internet Protocol (IP) packets) for transmission using one or more network transmission protocol (e.g., a cellular network transmission protocol described in more detail below). In one embodiment, the network packets include control information and payload data, with the control information specifying originating/destination network addresses, error control signals, signals for reconstructing the user data from the packets, and/or other related information. In embodiments supporting voice-based interaction and/or communications, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech recognition, speech encoding, channel encoding, encrypting, and interleaving.

In one embodiment, the processed network packets and/or voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission through the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The local base station or similar component then forwards data or network packets to a gateway server (e.g., a gateway to the Internet) for connectivity to network components used for providing shared vehicle availability detection. In embodiments supporting voice-based interactions and/or communications, voice signals may be forwarded from the local base station to a remote terminal which may be another mobile computer, cellular telephone, and/or any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide shared vehicle availability detection based on vehicle trajectory information. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details (e.g., data and/or voice subscriptions), and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for optimizing intermodal route computations, comprising:
   retrieving shared vehicle availability data for a plurality of geographic areas, wherein the shared vehicle availability data is associated with modes of transport that can be used to generate an intermodal route;
   processing the shared vehicle availability data to determine a shared vehicle availability pattern for each geographic area of the geographic areas, wherein the shared vehicle availability pattern is indicated by a metric indicating a count of shared vehicles available per said each geographic area;
   flagging at least one geographic area of the geographic areas as not suitable for generating the intermodal route based on determining that the metric is below a threshold value for the at least one geographic area;
   generating an intermodal vehicle availability model based on the shared vehicle availability pattern, wherein the intermodal vehicle availability model indicates a plurality of possible combinations of the modes of transport for the geographic areas except the at least one flagged geographic area; and
   in response to a request, retrieving and applying the generated intermodal vehicle availability model to generate the intermodal route for an origin and a destination based on at least one of the plurality of possible combinations of the modes of transport in the generated intermodal vehicle availability model, and presenting the intermodal route.

2. The method of claim 1, wherein the shared vehicle availability data includes historical shared vehicle availability data collected from the geographic areas over a period of time.

3. The method of claim 1, further comprising:
   partitioning a region into the geographic areas based on a grid, a tessellation, or Voronoi segmentation.

4. The method of claim 1, wherein each of the plurality of possible combinations of the modes of transport is represented by a transport mode matrix, and wherein the transport mode matrix links a first set of the modes of transport that can be used for a first leg of the intermodal route terminating in said each geographic area and a second set of the modes of transport that can be used to continue onto a second leg of the intermodal route from said each geographic area.

5. The method of claim 1, wherein the intermodal vehicle availability model, the shared vehicle availability data, the shared vehicle availability pattern, or a combination thereof is determined with respect to a contextual parameter.

6. The method of claim 5, wherein the contextual parameter includes parking availability near the origin, the destination, or a combination thereof.

7. The method of claim 5, wherein the contextual parameter includes a temporal parameter.

8. The method of claim 5, wherein the contextual parameter includes a shared vehicle provider.

9. The method of claim 1, wherein the modes of transport include a car, a bicycle, an electric bicycle, a scooter, a mini scooter, a public transport, a ride hailing service, or a combination thereof.

10. The method of claim 1, wherein a boundary of the geographic areas is determined by a block size, a shared vehicle density, a geographical district, a geofence, or a combination thereof.

11. An apparatus comprising:
at least one processor; and
at least one memory including computer program code for one or more programs,
the at least one memory and the computer program code configured to, with the at least one processor, cause the apparatus to perform at least the following,
retrieve shared vehicle availability data for a plurality of geographic areas, wherein the shared vehicle availability data is associated with modes of transport that can be used to generate an intermodal route;
process the shared vehicle availability data to determine a shared vehicle availability pattern for each geographic area of the geographic areas, wherein the shared vehicle availability pattern is indicated by a metric indicating a count of shared vehicles available per said each geographic area;
flag at least one geographic area of the geographic areas as not suitable for generating the intermodal route based on determining that the metric is below a threshold value for the at least one geographic area;
generate an intermodal vehicle availability model based on the shared vehicle availability pattern, wherein the intermodal vehicle availability model indicates a plurality of possible combinations of the modes of transport for the geographic areas except the at least one flagged geographic area; and
in response to a request, retrieve and apply the generated intermodal vehicle availability model to generate the intermodal route for an origin and a destination based on at least one of the plurality of possible combinations of the modes of transport in the generated intermodal vehicle availability model, and presenting the intermodal route.

12. The apparatus of claim 11, wherein the shared vehicle availability data includes historical shared vehicle availability data collected from the geographic areas over a period of time.

13. The apparatus of claim 11, wherein the apparatus is further caused to partition a region into the geographic areas based on a grid, a tessellation, or Voronoi segmentation.

14. The apparatus of claim 11, wherein each of the plurality of possible combinations of the modes of transport is represented by a transport mode matrix, and wherein the transport mode matrix links a first set of the modes of transport that can be used for a first leg of the intermodal route terminating in said each geographic area and a second set of the modes of transport that can be used to continue onto a second leg of the intermodal route from said each geographic area.

15. The apparatus of claim 11, wherein the intermodal vehicle availability model, the shared vehicle availability data, the shared vehicle availability pattern, or a combination thereof is determined with respect to a contextual parameter.

16. The apparatus of claim 15, wherein the contextual parameter includes parking availability near the origin, the destination, or a combination thereof.

17. A non-transitory computer-readable storage medium carrying one or more sequences of one or more instructions which, when executed by one or more processors, cause an apparatus to at least perform the following steps:
retrieving shared vehicle availability data for a plurality of geographic areas, wherein the shared vehicle availability data is associated with modes of transport that can be used to generate an intermodal route;
processing the shared vehicle availability data to determine a shared vehicle availability pattern for each geographic area of the geographic areas, wherein the shared vehicle availability pattern is indicated by a metric indicating a count of shared vehicles available per said each geographic area;
flagging at least one geographic area of the geographic areas as not suitable for generating the intermodal route based on determining that the metric is below a threshold value for the at least one geographic area;
generating an intermodal vehicle availability model based on the shared vehicle availability pattern, wherein the intermodal vehicle availability model indicates a plurality of possible combinations of the modes of transport for the geographic areas except the at least one flagged geographic area; and
in response to a request, retrieving and applying the generated intermodal vehicle availability model to generate the intermodal route for an origin and a destination based on at least one of the plurality of possible combinations of the modes of transport in the generated intermodal vehicle availability model, and presenting the intermodal route.

18. The non-transitory computer-readable storage medium of claim 17, wherein the shared vehicle availability data includes historical shared vehicle availability data collected from the geographic areas over a period of time.

19. The non-transitory computer-readable storage medium of claim 17, wherein the apparatus is further caused to perform:
partitioning a region into the geographic areas based on a grid, a tessellation, or
Voronoi segmentation.

* * * * *